(12) United States Patent
Yamaguchi et al.

(10) Patent No.: US 11,914,682 B2
(45) Date of Patent: Feb. 27, 2024

(54) SOFTWARE VERIFICATION DEVICE

(71) Applicant: Mitsubishi Electric Corporation, Tokyo (JP)

(72) Inventors: Teruyoshi Yamaguchi, Tokyo (JP); Nobuhiro Kobayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 479 days.

(21) Appl. No.: 17/191,369

(22) Filed: Mar. 3, 2021

(65) Prior Publication Data

US 2021/0192014 A1    Jun. 24, 2021

Related U.S. Application Data

(63) Continuation of application No. PCT/JP2018/038210, filed on Oct. 12, 2018.

(51) Int. Cl.
*G06F 21/10* (2013.01)
*G06F 21/44* (2013.01)
*H04L 9/32* (2006.01)

(52) U.S. Cl.
CPC ............ *G06F 21/105* (2013.01); *G06F 21/44* (2013.01); *H04L 9/3236* (2013.01); *H04L 9/3247* (2013.01)

(58) Field of Classification Search
CPC ..... G06F 21/44; G06F 21/105; H04L 9/3236; H04L 9/3247
USPC .......................................................... 726/26
See application file for complete search history.

(56) References Cited

U.S. PATENT DOCUMENTS

| 7,350,204 | B2 |   | 3/2008 | Lambert et al. |
| 8,375,458 | B2 | * | 2/2013 | Kiehtreiber ............. G06F 21/12 726/30 |
| 8,739,300 | B2 | * | 5/2014 | Krajna ................... H04L 63/166 726/28 |

(Continued)

FOREIGN PATENT DOCUMENTS

CN         101582880 A  *  11/2009
CN         103209225 A  *   7/2013

(Continued)

OTHER PUBLICATIONS

RD-691021-A, Nov. 2021, RD.*

(Continued)

*Primary Examiner* — Peter C Shaw
(74) *Attorney, Agent, or Firm* — Birch, Stewart, Kolasch & Birch, LLP

(57) ABSTRACT

When a hash expected value, which is an expected value of a hash value of activation software, is stored in a storing unit (111), a security calculation unit (110) compares the hash value of the activation software with the hash expected value. A main calculation unit (109) activates the activation software when the hash value and the hash expected value match, and stops a process when both do not match. The main calculation unit (109) performs signature verification for the activation software when the hash expected value is not stored in the storing unit (111), and stores in the storing unit (111) as the hash value expected value, the hash value of the activation software as well as activates the activation software when the signature verification is successful. The main calculation unit (109) stops a process when the signature verification is not successful.

4 Claims, 16 Drawing Sheets

(56) References Cited

U.S. PATENT DOCUMENTS

| | | | |
|---|---|---|---|
| 9,087,199 | B2 | 7/2015 | Sallam |
| 9,629,928 | B1 * | 4/2017 | Olsen .................... A61K 48/00 |
| 9,965,268 | B2 | 5/2018 | Kawazu |
| 2012/0117658 | A1 | 5/2012 | Haga et al. |
| 2013/0125244 | A1 | 5/2013 | Sugano |
| 2014/0298034 | A1 | 10/2014 | Watanabe et al. |
| 2019/0028267 | A1 | 1/2019 | Takemori et al. |

FOREIGN PATENT DOCUMENTS

| | | | |
|---|---|---|---|
| EP | 1 369 764 B1 | 12/2009 | |
| JP | 2012-32925 A | 2/2012 | |
| JP | 2015-22521 A | 2/2015 | |
| JP | 2015-180097 A | 10/2015 | |
| JP | 2017-130908 A | 7/2017 | |
| JP | 2017-208859 A | 11/2017 | |
| JP | 2018-6782 A | 1/2018 | |
| WO | WO 2011/142095 A1 | 11/2011 | |
| WO | WO-2020075303 A1 * | 4/2020 | ........... G06F 21/105 |

OTHER PUBLICATIONS

Moreira et al., "Securing IEEE 1588 messages with message authentication codes based on the KECCAK cryptographic algorithm implemented in FPGAs," 2014 IEEE 23rd International Symposium on Industrial Electronics (ISIE), Istanbul, Turkey, 2014, pp. 1899-1904, doi: 10.1109/ISIE.2014.6864905. (Year: 2014).*
Crenne et al., "Efficient key-dependent message authentication in reconfigurable hardware," 2011 International Conference on Field-Programmable Technology, New Delhi, India, 2011, pp. 1-6, doi: 10.1109/FPT.2011.6132722. (Year: 2011).*
Huth et al., "Secure software update and IP protection for untrusted devices in the Internet of Things via physically unclonable functions," 2016 IEEE International Conference on Pervasive Computing and Communication Workshops (PerCom Workshops), Sydney, NSW, Australia, 2016, pp. 1-6. (Year: 2016).*
Brown et al., "A new model for updating software in wireless sensor networks," in IEEE Network, vol. 20, No. 6, pp. 42-47, Nov.- Dec. 2006, doi: 10.1109/MNET.2006.273120. (Year: 2006).*
German Office Action for German Application No. 112018007934. 1, dated Dec. 3, 2021, with an English translation.
German Office Action dated Jan. 9, 2023 for Application No. 11 2018 007 934.1 with an English translation.
International Search Report for PCT/JP2018/038210 dated Jan. 8, 2019.
Microsoft, "Security protection of boot process in Windows 10", "https://docs.microsoft.com/ja-jp/windows/security/hardware-protection/secure-the-windows-10-boot-process", 2018.

* cited by examiner

SOFTWARE VERIFICATION DEVICE

CROSS REFERENCE TO RELATED APPLICATION

This application is a Continuation of PCT International Application No. PCT/JP2018/038210, filed on Oct. 12, 2018, which is hereby expressly incorporated by reference into the present application.

TECHNICAL FIELD

The present invention relates to a software verification device, a software verification method, and a software verification program. In particular, the present invention relates to a software verification device, a software verification method, and a software verification program that perform secure boot.

BACKGROUND ART

In recent years, even in embedded control apparatuses, secure boot is increasing to be adopted in order to prevent unauthorized programs from being executed. The secure boot means to execute software after confirming by a method such as digital signature at a time of activating apparatus, that the software has not been tampered with. Specifically, the secure boot means to prevent execution of unauthorized programs such as a rootkit. Conventional secure boot is realized by using UEFI (Unified Extensible Firmware Interface) and TPM (Trusted Platform Module).

In Non-Patent Literature 1, while signature verification of the program is performed, the hash is stored in the TPM. Finally, by signing the hash by the TPM and inquiring an external server, integrity of the software is verified.

Further, Patent Literature 1 discloses a method of generating a hash list of the software with a signature at a time of development and of verifying the list at a time of boot.

CITATION LIST

Patent Literature

Patent Literature 1: International Publication WO2011/142095

Non-Patent Literature

Non-Patent Literature 1: Microsoft, "Security protection of boot process in Windows 10" https://docs.microsoft.com/ja-jp/windows/security/hardware-protection/secure-the-windows-10-boot-process

SUMMARY OF INVENTION

Technical Problem

In a technique of Non-Patent Literature 1, activation is slow since signature verification is performed for each software. In addition, a downgrade attack that restore the software itself and the signature to old versions cannot be detected. Further, integrity of a software configuration cannot be determined unless it is possible to communicate with an external server.

The technique of Patent Literature 1 cannot detect a downgrade attack that restores an entire hash list to an old version.

The present invention aims to speed up verification of integrity of a plurality of pieces of software and to verify the integrity of a software configuration by a device alone.

Solution to Problem

A software verification device according to the present invention, which activates activation software to be activated, in the software verification device, includes:

a security calculation unit to comprise a storing unit, and if a hash expected value, which is an expected value of a hash value of the activation software, is stored in the storing unit, compare the hash value of the activation software with the hash expected value; and a main calculation unit to activate the activation software when the hash value and the hash expected value match, and stop a process when both do not match, and wherein the main calculation unit performs signature verification for the activation software when the hash expected value is not stored in the storing unit, stores in the storing unit as the hash value expected value, the hash value of the activation software as well as activates the activation software when the signature verification is successful, and stops a process when the signature verification is not successful.

Advantageous Effects of Invention

In a software verification device according to the present invention, a security calculation unit stores a hash value of activated software in a storing unit as a hash expected value. Then, the security calculation unit determines validity of activation software by comparing with the hash expected value, the hash value of the activation software to be activated this time. Therefore, according to the software verification device according to the present invention, a process of signature verification can be reduced and activation can be speeded up.

DESCRIPTION OF EMBODIMENTS

Figure 1:
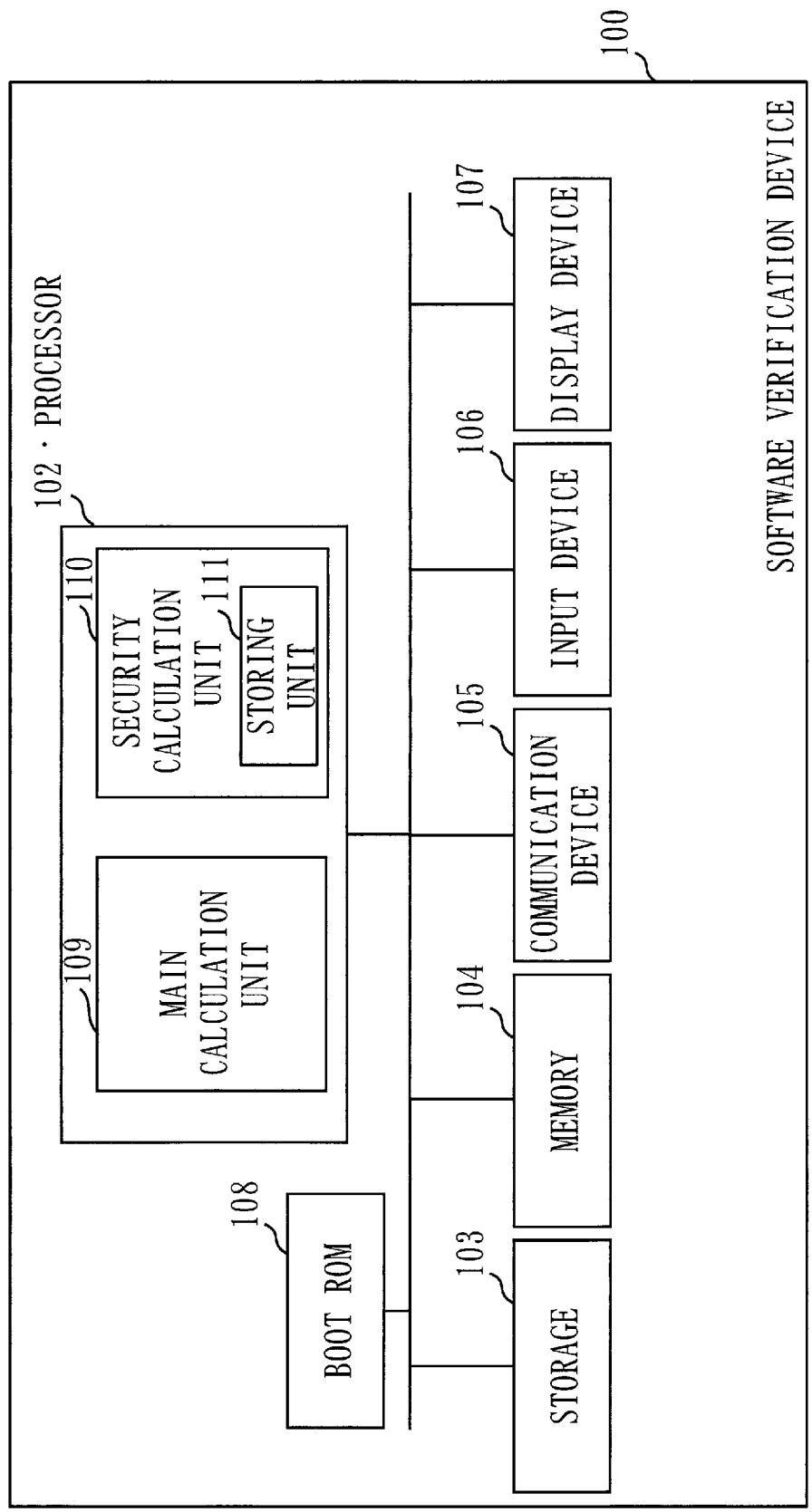
FIG. 1 is a configuration diagram of a software verification device according to a first embodiment.

Hereinafter, embodiments of the present invention will be described with reference to the drawings. Besides, in the drawings, the same reference numerals are assigned to the same or corresponding parts. Descriptions of the same or corresponding parts are omitted or simplified appropriately.

First Embodiment

* Description of Configuration *

A configuration of a software verification device 100 according to the present embodiment will be described with reference to FIG. 1.

The software verification device 100 is a computer. The software verification device 100 includes a processor 102 as well as other pieces of hardware such as a storage 103, a memory 104, a communication device 105, an input device 106, a display device 107, and a boot ROM (Read Only Memory) 108. The processor 102 is connected to other pieces of hardware via signal lines and controls these other pieces of hardware.

The processor 102 is a CPU (Central Processing Unit) that performs a process such as verifying signature of activation software to be activated at a time of boot. The processor 102 includes a main calculation unit 109 and a security calculation unit 110 as functional elements. The main calculation unit 109 performs a process such as a boot process or an application process. The security calculation unit 110 securely stores information such as a highly confidential key, or performs an encryption process such as AES (Advanced Encryption Standard). Besides, in the present embodiment, signature verification is performed by the main calculation unit 109 since highly confidential information is not used. Further, comparison of hash values or generation and verification of MAC is performed by the security calculation unit 110 since the highly confidential information is used.

Further, the processor 102 includes a non-volatile memory. In FIG. 1, the main calculation unit 109 and the security calculation unit 110 are mounted in a same processor, but a different configuration may be used as long as data transmission of both can be performed securely.

The storage 103 is a non-volatile storage element that stores software to be verified and its signature. The memory 104 is a volatile storage element in which the processor 102 temporarily expands a calculation result.

A boot ROM 108 contains a boot program that is executed first when power is turned on. The boot ROM 108 can only be read, not written.

Each piece of hardware will be described in more detail.

The software verification device 100 includes the main calculation unit 109 and the security calculation unit 110 as functional elements. The security calculation unit 110 includes a storing unit 111. Functions of the main calculation unit 109 and the security calculation unit 110 are realized by software. The storing unit 111 is provided in the non-volatile memory provided in the processor 102.

The processor 102 is a device that executes a software verification program. The software verification program is a program that realizes functions of the main calculation unit 109 and the security calculation unit 110.

The processor 102 is an IC (Integrated Circuit) that performs a calculation process. In addition to the CPU, a specific example of the processor 102 may be a DSP (Digital Signal Processor) or a GPU (Graphics Processing Unit).

The memory 104 is a storage device that temporarily stores data. A specific example of the memory 104 is an SRAM (Static Random Access Memory) or a DRAM (Dynamic Random Access Memory).

The storage 103 is a storage device that stores data. A specific example of the storage 103 is an HDD. Further, the storage 103 may be a portable storage medium such as an SD (registered trademark) memory card, CF, NAND flash, a flexible disk, an optical disk, a compact disk, a Blu-ray (registered trademark) disk, or a DVD. Besides, HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input device 106 is an input device such as a mouse, a keyboard, or a touch panel. Besides, the input device 106 may be a port connected to a LAN (Local Area Network).

The display device 107 is an output apparatus such as a display. Specifically, the display device 107 is connected to an interface such as a USB terminal or an HDMI (registered trademark) (High Definition Multimedia Interface) terminal. Specifically, the display is an LCD (Liquid Crystal Display).

The communication device 105 has a receiver and a transmitter. The communication device 105 is connected to a communication network such as a LAN, the Internet, or a telephone line. Specifically, the communication device 105 is a communication chip or an NIC (Network Interface Card).

In the present embodiment, the communication device 105, the input device 106, or the display device 107 is dispensable.

The software verification program is read into the processor 102 and executed by the processor 102. In the memory 104, in addition to the software verification program, the OS (Operating System) is also stored. The processor 102 executes the software verification program while executing the OS. The software verification program and the OS may be stored in the storage 103. The software verification program and the OS stored in the storage 103 are loaded into the memory 104 and executed by the processor 102. Besides, a part or all of the software verification program may be incorporated in the OS.

The software verification device 100 may include a plurality of processors that replace the processor 102. A plurality of these processors share execution of the software verification program. Each processor, in the same manner as the processor 102, is a device that executes the software verification program.

Data, information, signal values, and variable values used, processed, or output by the software verification program are stored in the memory 104, the storage 103, or the nonvolatile memory, the register, or the cache memory in the processor 102.

"Unit" of each unit of the main calculation unit 109 and the security calculation unit 110 may be read as "process", "procedure", or "step". Further, "process" of the main calculation process and the security calculation process may be read as "program", "program product", or "computer-readable storage medium storing a program".

The software verification program causes a computer to execute each process, each procedure, or each step obtained by reading "unit" of each of the above units as "process", "procedure", or "step". Further, a software verification method is a method performed by the software verification device 100 executing the software verification program.

The software verification program may be provided by being stored in a computer-readable recording medium. Further, the software verification program may also be provided as a program product.

* Description of Operation *

Figure 2:
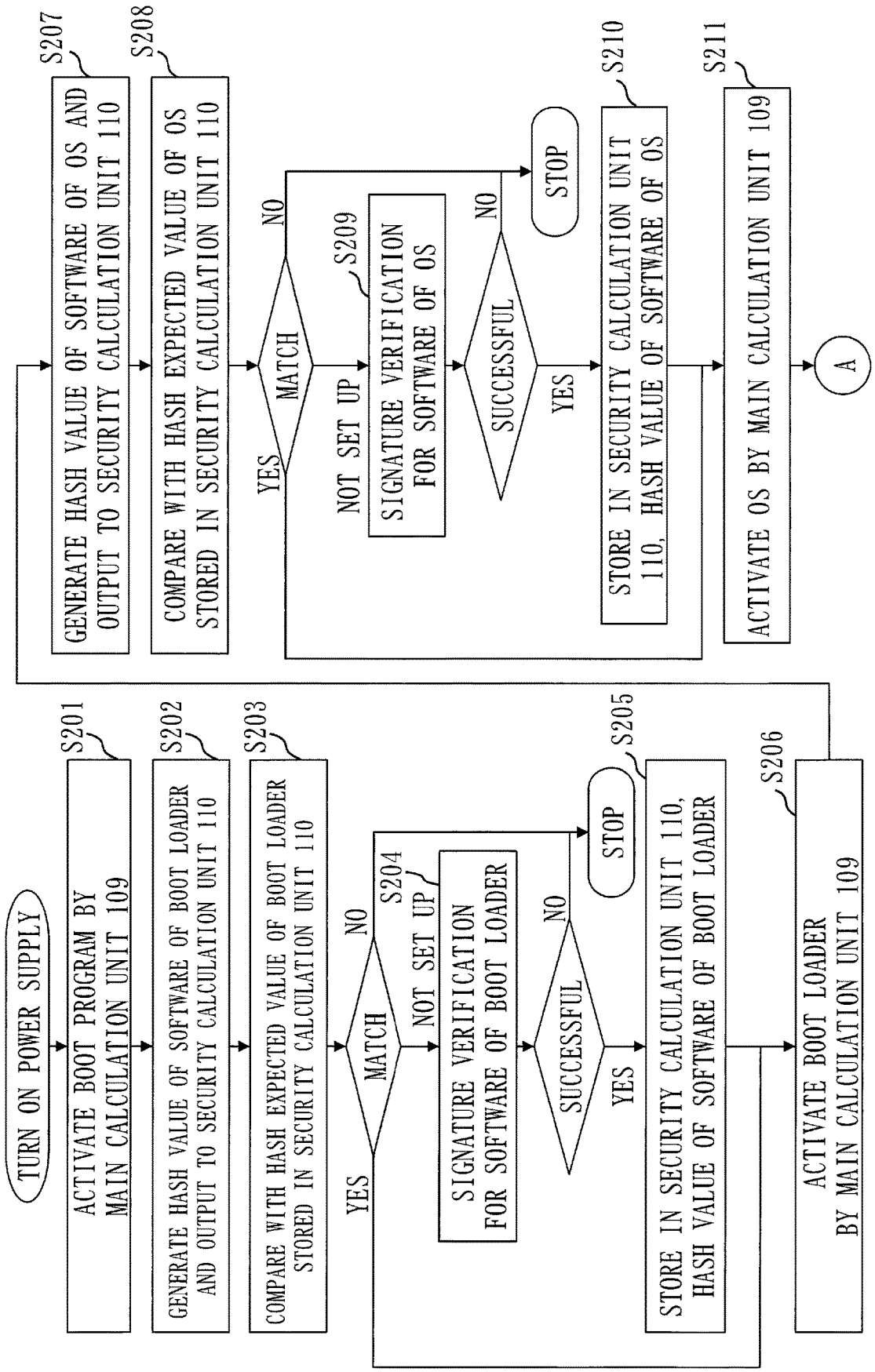
FIG. 2 is a flow diagram of a boot operation of the software verification device according to the first embodiment.
Figure 3:
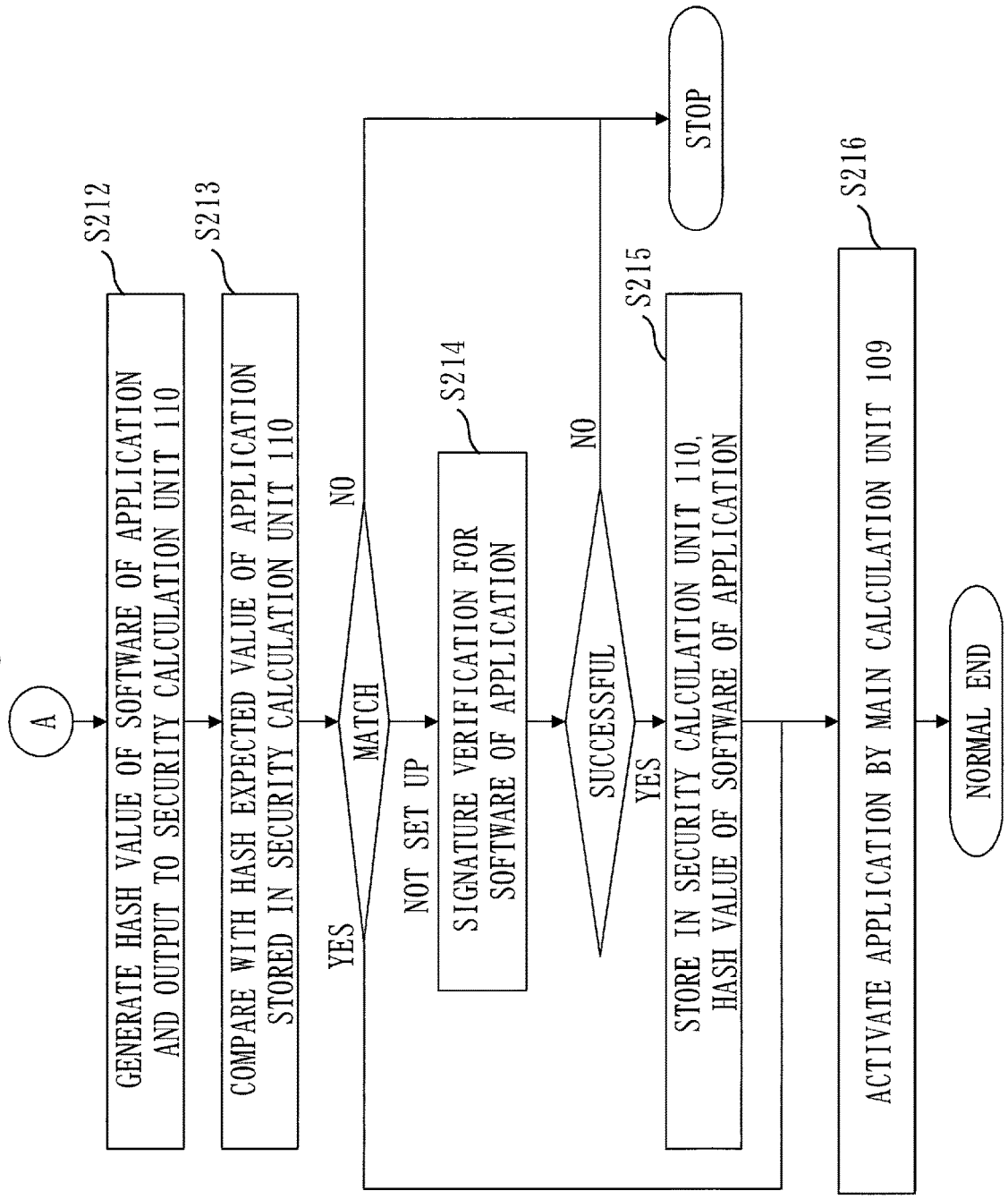
FIG. 3 is a flow diagram of a boot operation of the software verification device according to the first embodiment.
Figure 4:
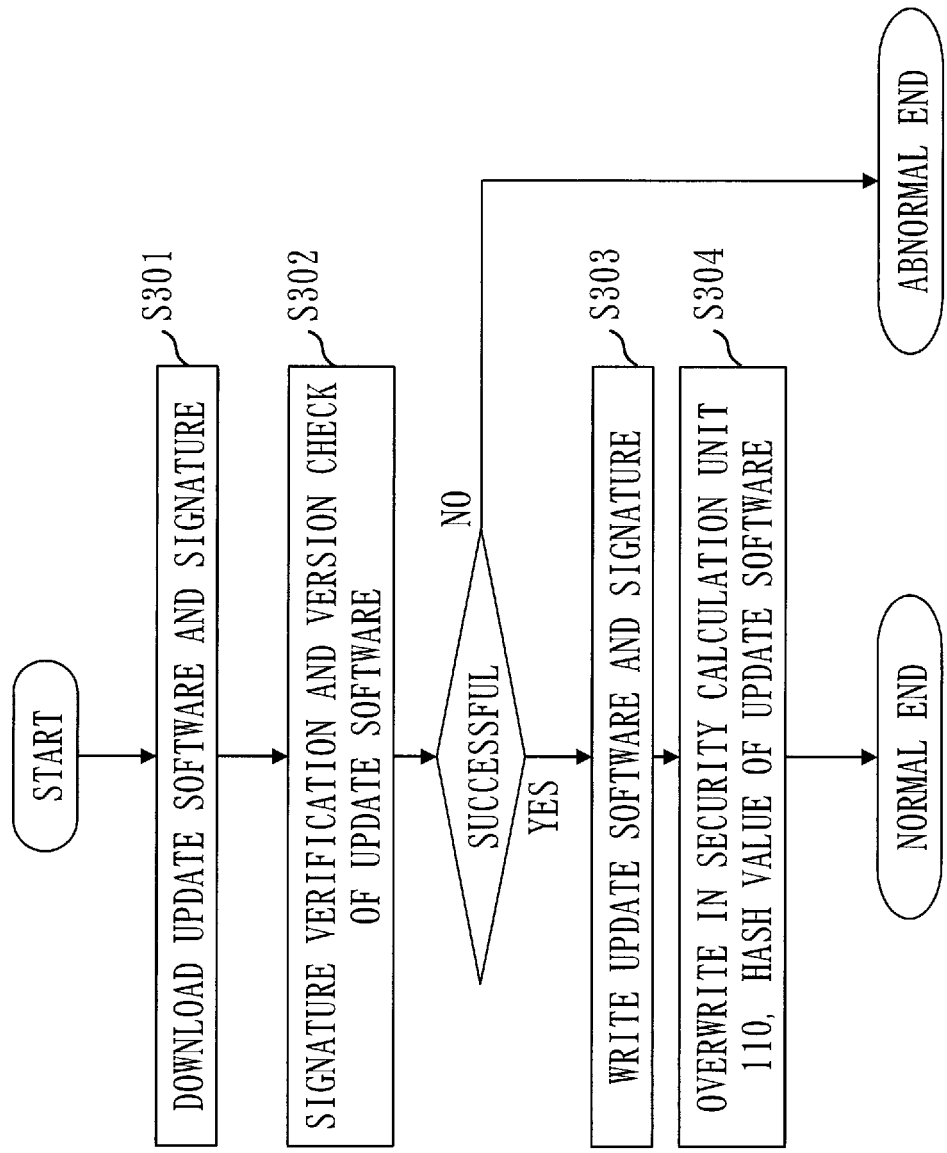
FIG. 4 is a flow diagram of a software update operation of the software verification device according to the first embodiment.

Next, an operation of the software verification device 100 according to the present embodiment will be described with reference to FIGS. 2 to 4. The software verification device 100 activates the activation software to be activated. In particular, the software verification device 100 activates a plurality of pieces of activation software in order. In the first to fifth embodiments described below, the software verification device 100 activates in the order of a boot program, a boot loader, an OS, an application. The boot loader, the OS, and the application are an example of the plurality of pieces of activation software.

First, a boot operation of the software verification device 100 according to the present embodiment will be described with reference to FIGS. 2 and 3.

In step S201, when the power is turned on, the main calculation unit 109 executes the boot program stored in the boot ROM 108.

In step S202, the boot program generates a hash value of the software of the boot loader and outputs the hash value to the security calculation unit 110.

In step S203, the security calculation unit 110 compares the hash value output from the boot program with a hash expected value of the boot loader stored in the storing unit 111. If both do not match, the main calculation unit 109 stops the process. If the hash expected value is not set in the storing unit 111, the process proceeds to step S204. Further, if both match, in step S206, the main calculation unit 109 activates the activation software. That is, the main calculation unit 109 activates the boot loader.

In this way, the security calculation unit 110 compares the hash value of the activation software with the hash expected value if the hash expected value, which is an expected value of the hash value of the activation software, is stored in the storing unit 111.

If the hash expected value is not stored in the storing unit 111, the main calculation unit 109 performs the signature verification for the activation software. Then, if the signature verification is successful, the main calculation unit 109 stores the hash value of the activation software as the hash expected value in the storing unit 111 and also activates the activation software. Specifically, it is as follows.

In step S204, the main calculation unit 109 performs the signature verification for the software of the boot loader. If the signature verification is successful, in step S205, the main calculation unit 109 stores in the storing unit 111 as the hash expected value, the hash value of the software of the boot loader. Specifically, the main calculation unit 109 outputs the success of the signature verification to the security calculation unit 110. When the security calculation unit 110 acquires the success of the signature verification from the main calculation unit 109, the security calculation unit 110 stores the hash value of the software of the boot loader in the storing unit 111 as the hash expected value. In the following, in some cases, that the main calculation unit 109 stores the hash expected value in the storing unit 111 in the security calculation unit 110 is described as that the main calculation unit 109 stores the hash expected value in the security calculation unit 110.

If the signature verification is not successful, the main calculation unit 109 stops the process.

In step S206, the main calculation unit 109 activates the boot loader. That is, the main calculation unit 109 activates the activation software when the hash value and the hash expected value match. Further, the main calculation unit 109 activates the activation software when the signature verification is successful.

In step S207, the boot loader generates a hash value of the software of the OS and outputs the hash value to the security calculation unit 110.

In step S208, the security calculation unit 110 compares the hash value output from the boot loader with the hash expected value of the OS stored in the security calculation unit 110, that is, the storing unit 111. If both do not match, the main calculation unit 109 stops the process. If the hash value is not set in the storing unit 111, the process proceeds to step S209. If both match, in step S211 the main calculation unit 109 activates the OS.

In step S209, the main calculation unit 109 performs the signature verification for the software of the OS. If the signature verification is successful, in step S210, the main calculation unit 109 stores the hash value of the software of the OS as the hash expected value in the security calculation unit 110, that is, the storing unit 111. If the signature verification is not successful, the main calculation unit 109 stops the process.

In step S211, the main calculation unit 109 activates the OS.

In step S212, the OS generates a hash value of the software of the application and outputs the hash value to the security calculation unit 110.

In step S213, the security calculation unit 110 compares the hash value output from the OS with the hash expected value of the application stored in the security calculation unit 110, that is, the storing unit 111. If both do not match, the main calculation unit 109 stops the process. If the hash value is not set in the storing unit 111, the process proceeds to step S214. If both match, in step S216, the main calculation unit 109 activates the application.

In step S214, the main calculation unit 109 performs the signature verification for the software of the application. If the signature verification is successful, in step S215, the main calculation unit 109 stores the hash value of the software of the application as the hash expected value in the security calculation unit 110, that is, the storing unit 111. If the signature verification is not successful, the main calculation unit 109 stops the process.

In step S216, the main calculation unit 109 activates the application.

The operation of the software update of the software verification device 100 according to the present embodiment will be described with reference to FIG. 4.

In step S301, the update software to be updated and its signature are downloaded.

In step S302, the main calculation unit 109 verifies the signature and version of the update software. Specifically, the version verification uses a method such as collation by a list. If the verification fails, the main calculation unit 109 cancels the process as an abnormal end. If the verification is successful, the process proceeds to step S303.

In step S303, the main calculation unit 109 writes the update software and the signature into the storage 103 or the memory 104.

In step S304, the main calculation unit 109 generates the hash value of the update software. The main calculation unit 109 overwrites and saves the hash value of the update software as the hash expected value of the update software into the storing unit 111 in the security calculation unit 110.

* Other Configurations *

Modification Example 1

According to the present embodiment, functions of the main calculation unit 109 and the security calculation unit 110 are realized by software. As a modification example, the functions of the main calculation unit 109 and the security calculation unit 110 may be realized by hardware.

Figure 5:
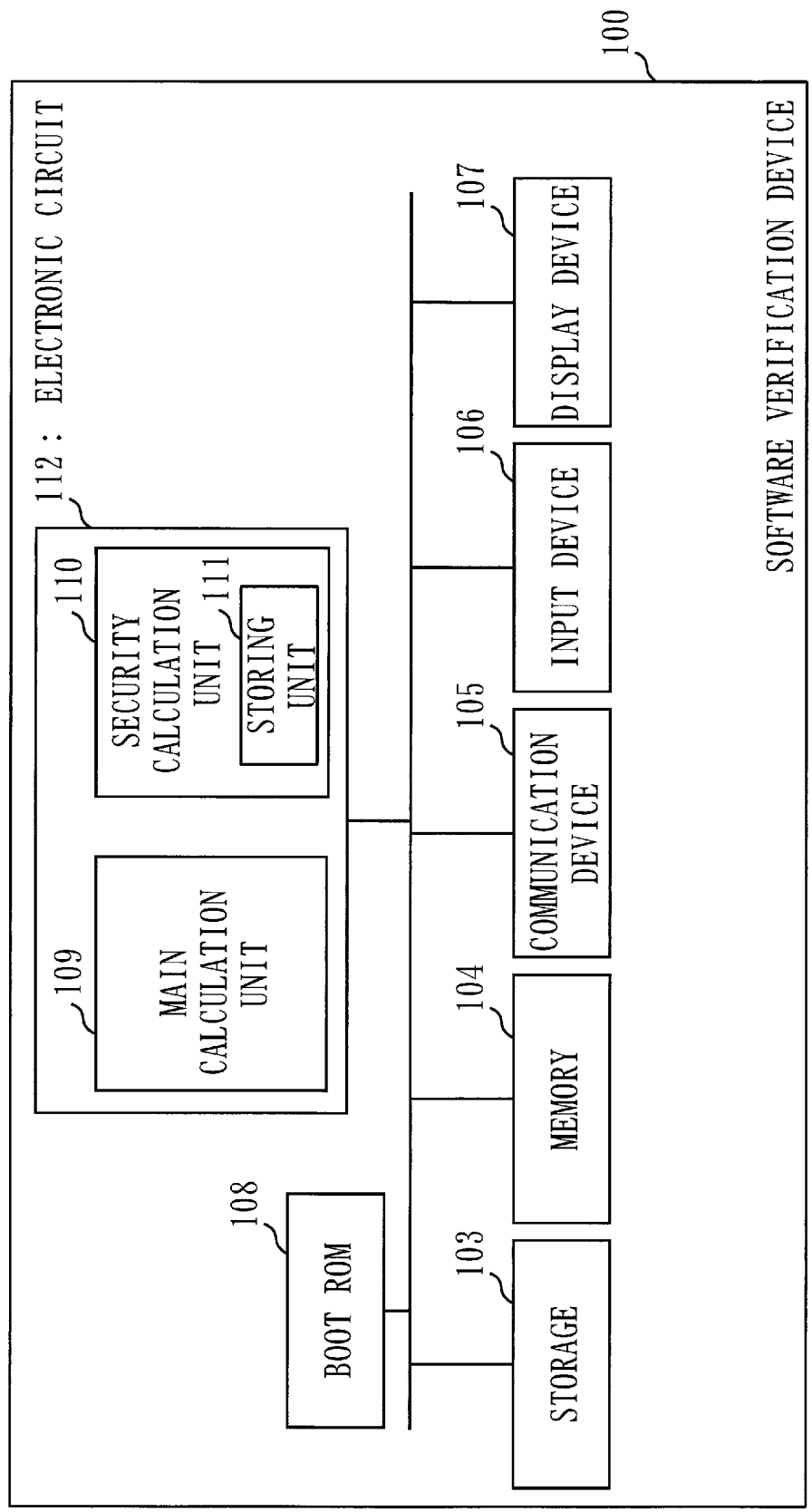
FIG. 5 is a configuration diagram of a software verification device according to a modification example of the first embodiment.

FIG. 5 is a diagram illustrating a configuration of a software verification device 100 according to a modification example of the present embodiment.

The software verification device 100 includes an electronic circuit 112 instead of the processor 102.

The electronic circuit 112 is a dedicated electronic circuit that realizes functions of the main calculation unit 109 and the security calculation unit 110.

The electronic circuit 112 is specifically a single circuit, a composite circuit, a programmed processor, a parallel programmed processor, a logic IC, a GA, an ASIC, or an FPGA. GA is an abbreviation for Gate Array. ASIC is an abbreviation for Application Special Integrated Circuit. FPGA is an abbreviation for Field-Programmable Gate Array.

Functions of the main calculation unit 109 and the security calculation unit 110 may be realized by one electronic circuit, or may be realized by being distributed to a plurality of electronic circuits.

As another modification example, a part of functions of the main calculation unit 109 and the security calculation unit 110 may be realized by an electronic circuit, and remaining functions may be realized by software. Further, at least a part of the functions of the main calculation unit 109 and the security calculation unit 110 may be realized by the firmware.

Each of the processor and the electronic circuit is also referred to as processing circuitry. That is, in the software verification device 100, function of the part of the functions of the main calculation unit 109 and the security calculation unit 110 is realized by the processing circuitry.

Description of Effect of Present Embodiment

According to the software verification device 100 according to the present embodiment, integrity verification of a plurality of pieces of software can be speeded up. Further, according to the software verification device 100 according to the present embodiment, it is possible to realize integrity verification for the software by the device alone.

According to the software verification device 100 according to the present embodiment, the hash value of the activation software is compared with the hash value of the software as activated last time. Therefore, every time the activation is performed, it is unnecessary to perform signature verification which requires load, and it is possible to speed up the activation. Further, by leaving the hash value of the activation software as activated last time, even if it is downgraded after the boot, it is possible to verify at the next boot. Further, according to the software verification device 100 according to the present embodiment, the verification of the activation software is closed inside the apparatus. Therefore, it is possible to verify the integrity by the device alone.

Second Embodiment

In the present embodiment, matters different from those in the first embodiment will be mainly described. The same reference numerals may be assigned to the same configurations as those in the first embodiment, and the descriptions thereof may be omitted.

* Description of Configuration *

In the first embodiment, the software verification device 100 stores in the storing unit 111 of the security calculation unit 110, the hash value of each piece of activation software of the plurality of pieces of activation software, and verifies the hash value one by one at a time of the boot. In the present embodiment, a method for collectively verifying the integrity of the plurality of pieces of activation software is indicated. A configuration of the software verification device 100 is the same as that in FIG. 1. Further, an operation of the software update according to the present embodiment is the same as that in the first embodiment.

The software verification device 100 according to the present embodiment activates a plurality of pieces of activation software in order. The software verification device 100 according to the present embodiment is activated in either a hash chain mode in which a hash chain is generated from the plurality of pieces of activation software or a signature verification mode in which signature verification is performed for each of the plurality of pieces of activation software.

* Description of Operation *

Figure 6:
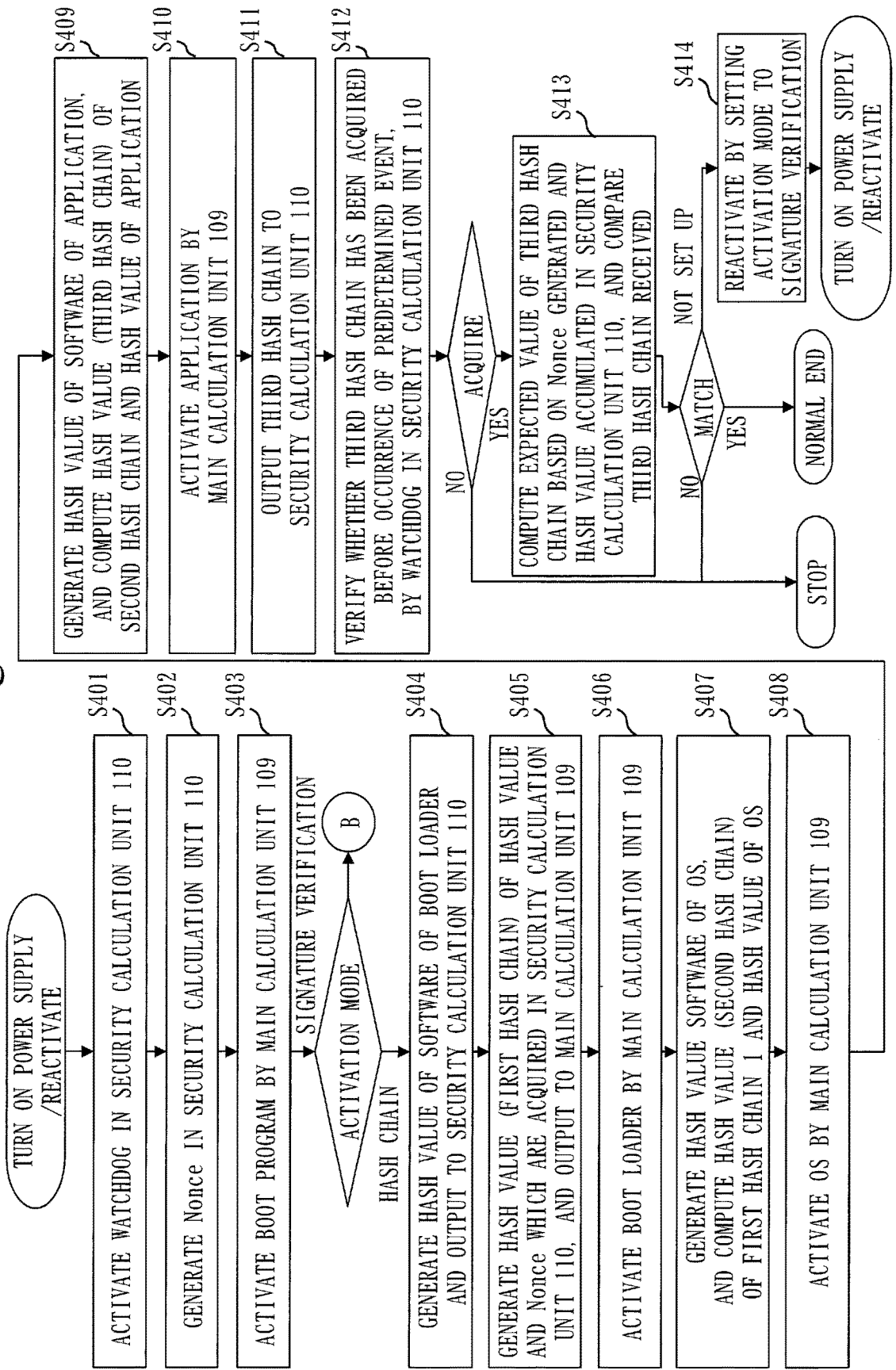
FIG. 6 is a flow diagram of a boot operation in a hash chain mode according to a second embodiment.

A boot operation of the software verification device 100 according to the present embodiment will be described with reference to FIGS. 6 and 7. FIG. 6 is the boot operation in a case of the hash chain mode.

In the present embodiment, the software verification device 100 is assumed to activate N (N is an integer of two or more) pieces of activation software in order. The software verification device 100 is activated in either the hash chain mode in which the hash chain is generated from the N pieces of activation software or the signature verification mode in which signature verification is performed for each of the N pieces of activation software.

When activated in the hash chain mode, the security calculation unit 110 acquires the hash value of preceding activation software to be activated first among the N pieces of activation software, as well as generates a random data string Nonce. The security calculation unit 110 generates the hash value of the preceding activation software and the hash value of Nonce as the first hash chain.

When the first hash chain is generated, the main calculation unit 109 activates the preceding activation software.

A specific example will be described below. Here, it is assumed that the boot loader, the OS, and the application, which are three pieces of activation software, are activated as the N pieces of activation software.

In step S401, when the power is turned on, the security calculation unit 110 activates watchdog. The watchdog monitors whether or not the system is operating properly.

In step S402, the security calculation unit 110 generates Nonce. The Nonce is a random data string with no reproducibility.

In step S403, the main calculation unit 109 executes the boot program stored in the boot ROM 108. The main calculation unit 109 confirms the activation mode by the boot program. If the activation mode is the hash chain mode, the process proceeds to step S404. If the activation mode is the signature verification mode, the process proceeds to step S415.

In step S404, the main calculation unit 109 generates a hash value of the software of the boot loader and outputs the hash value to the security calculation unit 110. The boot loader is an example of the preceding activation software to be activated first.

In step S405, the security calculation unit 110 generates as the first hash chain, a hash value of: the hash value acquired from the main calculation unit 109; and the Nonce. The security calculation unit 110 outputs the first hash chain to the main calculation unit 109.

In step S406, when the first hash chain is generated, the main calculation unit 109 activates the boot loader which is the preceding activation software.

The main calculation unit 109 acquires the hash value of next activation software to be activated at the k-th (k is an integer of two or more and N or less) among the N pieces of activation software. The security calculation unit 110 generates as the k-th hash chain, a hash value of: the (k−1)-th hash chain; and the hash value of the next activation software, as well as activates the next activation software.

Here, the next activation software to be activated second as the k-th is assumed to be an OS.

In step S407, the boot loader generates a hash value of the software of the OS. Then, the boot loader generates as the second hash chain, a hash value of: the first hash chain; and the hash value of the software of the OS.

In step S408, the main calculation unit 109 activates the OS which is the next activation software.

Next, the next activation software to be activated third as the k-th is assumed to be an application.

In step S409, the OS generates a hash value of the software of the application. Then, the OS generates as the third hash chain, a hash value of: the second hash chain; and the hash value of the software of the application.

In step S410, the main calculation unit 109 activates the application which is the next activation software.

The main calculation unit 109 outputs the k-th hash chain to the security calculation unit 110 if the next activation software is the activation software to be activated last among the N pieces of activation software.

If the hash value of each of the N pieces of activation software is stored in the security calculation unit 110, that is, the storing unit 111, the security calculation unit 110 computes the expected value of the k-th hash chain as the hash chain expected value. The security calculation unit 110 computes the hash chain expected value by using the hash value of each of the N pieces of activation software and Nonce. Then, the security calculation unit 110 compares the k-th hash chain with the hash chain expected value.

The main calculation unit 109 ends normally if the k-th hash chain and the hash chain expected value match, and stops the process if both do not match. Further, if the hash value of each of the N pieces of activation software is not stored in the storing unit 111, the main calculation unit 109 reactivates by setting the activation mode to the signature verification mode.

Specifically, it is as follows.

In step S411, the main calculation unit 109 outputs the third hash chain to the security calculation unit 110.

In step S412, the watchdog in the security calculation unit 110 verifies whether or not the hash value has been acquired before occurrence of a predetermined event. The predetermined event may be, for example, an elapsed time from the activation or an event such as use of a communication device. When the acquisition is verified, the process proceeds to step S413. If the acquisition is not verified, the main calculation unit 109 stops the process.

In step S413, the security calculation unit 110 computes the expected value of the third hash chain as the hash chain expected value based on the internally generated Nonce and the hash value stored in the storing unit 111. The security calculation unit 110 compares the hash chain expected value with the acquired third hash chain. If both match, the process ends normally. If both do not match, the main calculation unit 109 stops the process. If the hash value is not set in the storing unit 111 in the security calculation unit 110, in step S414, the main calculation unit 109 sets the activation mode to the signature verification mode and reactivates.

Figure 7:
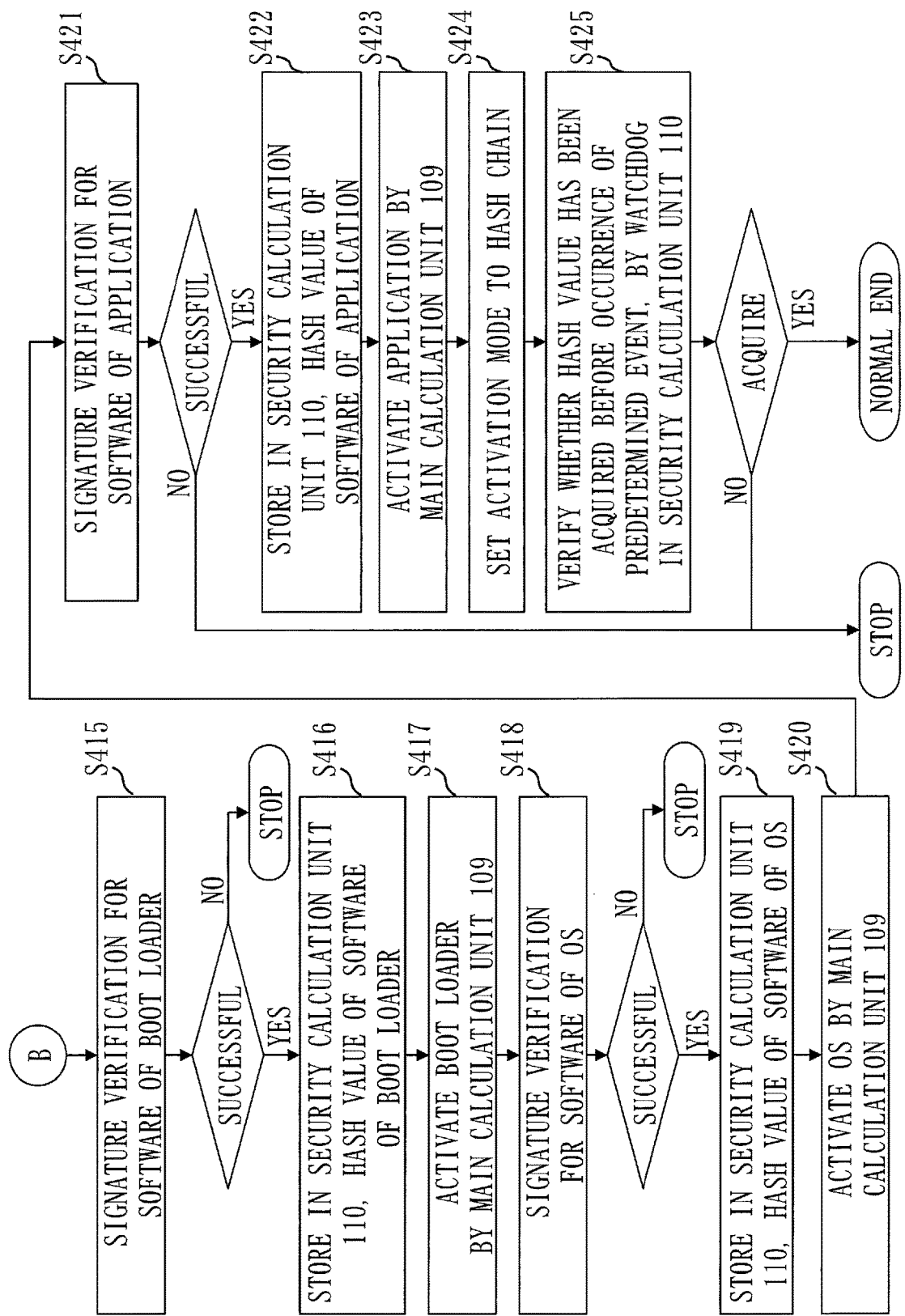
FIG. 7 is a flow diagram of a boot operation in a signature verification mode according to the second embodiment.

FIG. 7 illustrates the boot operation in the signature verification mode.

When the main calculation unit 109 is activated in the signature verification mode, the main calculation unit 109 performs the signature verification for each piece of activation software of the N pieces of activation software. Then, if the signature verification is successful, the main calculation unit 109 stores in the storing unit 111 in the security calculation unit 110, the hash value of each piece of activation software, and activates each piece of activation software. If the signature verification fails, the main calculation unit 109 stops the process. Further, when the main calculation unit 109 succeeds in the signature verification for all the N pieces of activation software, the main calculation unit 109 sets the activation mode to the hash chain mode.

A specific example will be described below.

In step S415, the main calculation unit 109 performs the signature verification for the software of the boot loader.

If the signature verification is successful, in step S416, the main calculation unit 109 stores in the storing unit 111 in the security calculation unit 110, the hash value of the software of the boot loader.

In step S417, the main calculation unit 109 activates the boot loader. If the signature verification fails, the main calculation unit 109 stops the process.

In step S418, the boot loader performs the signature verification for the software of the OS.

If the signature verification is successful, in step S419, the boot loader stores in the storing unit 111 in the security calculation unit 110, the hash value of the software of the OS.

In step S420, the main calculation unit 109 activates the OS. If the signature verification fails, the main calculation unit 109 stops the process.

In step S421, the OS performs the signature verification for the software of the application. If the signature verification is successful, the process proceeds to step S422. If the signature verification fails, the main calculation unit 109 stops the process.

In step S422, the main calculation unit 109 stores in the storing unit 111 in the security calculation unit 110, the hash value of the software of the application.

In step S423, the main calculation unit 109 activates the application.

In step S424, the OS sets the activation mode to the hash chain.

In step S425, the watchdog in the security calculation unit 110 verifies whether or not the hash value has been acquired before occurrence of a predetermined event. The predetermined event may be, for example, an elapsed time from the activation or an event such as use of a communication device. If the hash value has not been acquired, the process is stopped.

Description of Effect of Present Embodiment

According to the software verification device 100 according to the present embodiment, it is possible to speed up the activation, verify the integrity by the device alone, and detect the downgrade in the same manner as the first embodiment. Further, according to the software verification device 100 according to the present embodiment, since the software integrity verification is performed last, it is possible to reduce the number of accesses to the security calculation unit which normally requires overhead for access.

Third Embodiment

In the present embodiment, the differences from the first and second embodiments will be mainly described. Besides, the same reference numerals may be assigned to the same configurations as those in the first and second embodiments, and the descriptions thereof may be omitted.

* Description of Configuration *

In the first and second embodiments, the hash value of the software at a time of previous activation is stored in the storing unit 111 which is a non-volatile memory in the security calculation unit 110. In the present embodiment, a method is indicated in which enables the hash value of the software at a time of the previous activation to be stored in the external storage 103 while maintaining safety. The hardware configuration is the same as in FIG. 1.

* Description of Operation *

Next, an operation of the software verification device 100 according to the present embodiment will be described with reference to FIGS. 8 to 11.

Figure 8:
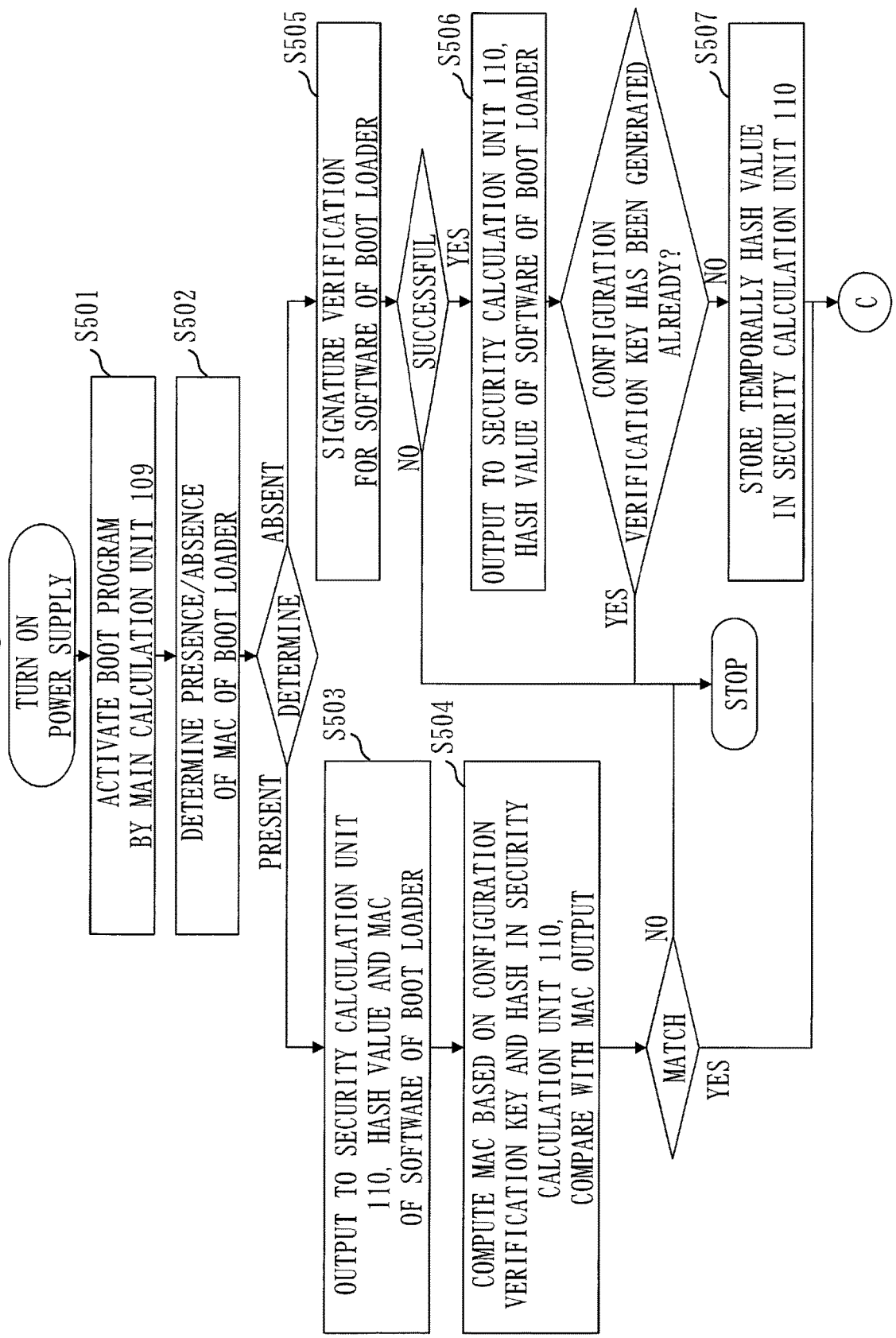
FIG. 8 is a flow diagram of a boot operation of a software verification device according to a third embodiment.
Figure 9:
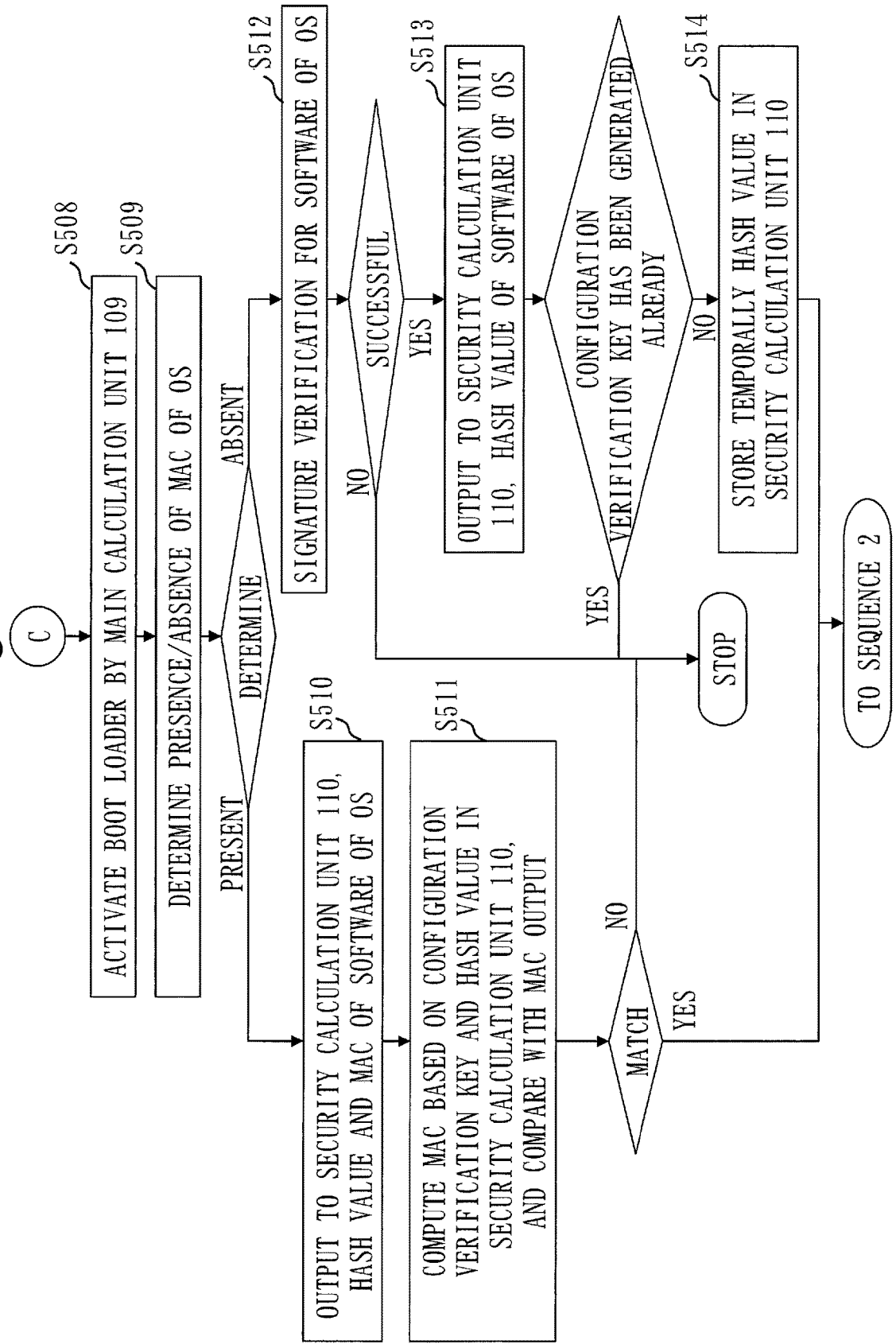
FIG. 9 is a flow diagram of a boot operation of the software verification device according to the third embodiment.
Figure 10:
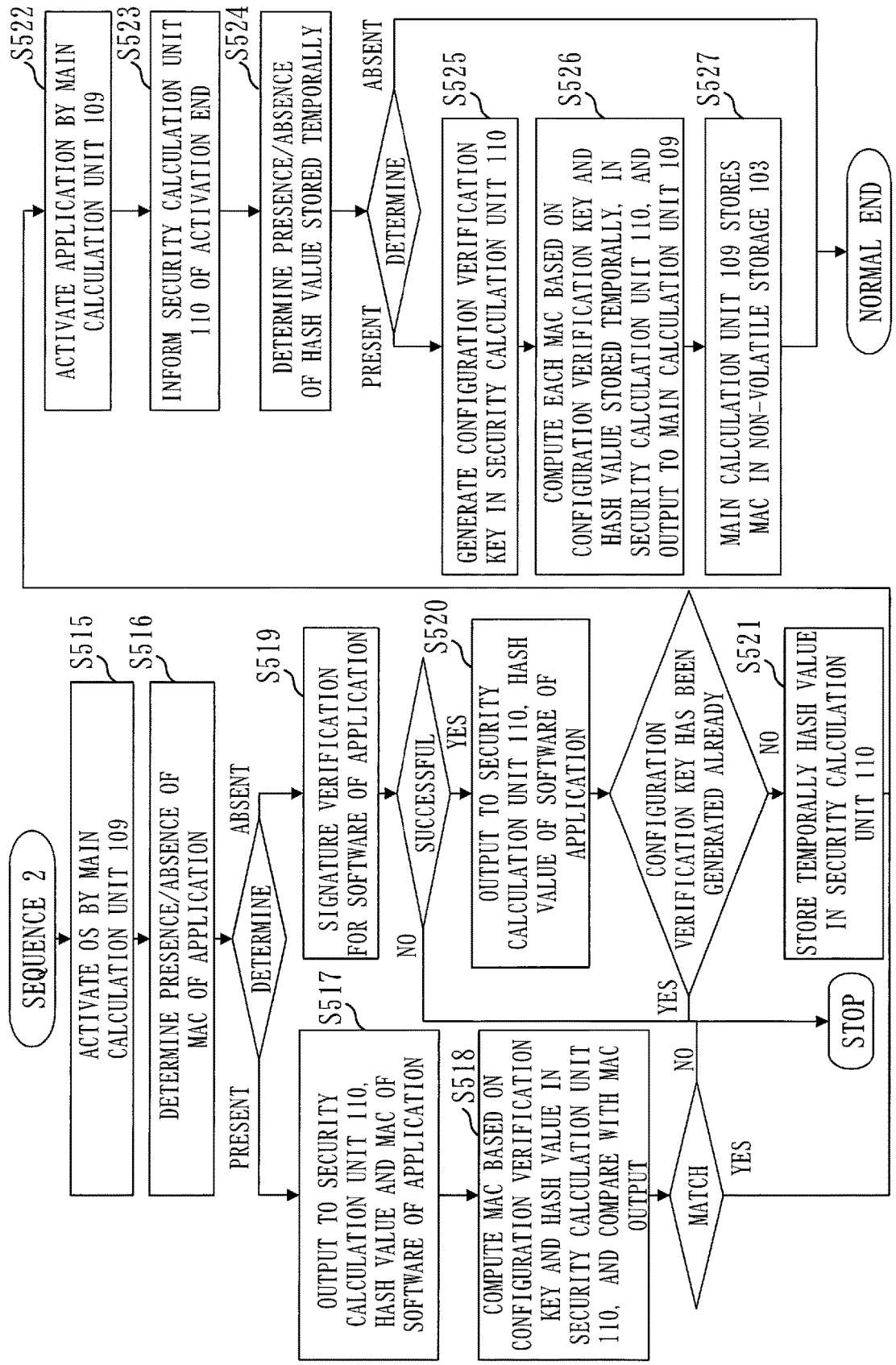
FIG. 10 is a flow diagram of a boot operation of the software verification device according to the third embodiment.

FIGS. 8 to 10 illustrate the boot operation according to the present embodiment. Outline of the boot operation according to the present embodiment will be described below.

The main calculation unit 109 determines presence/absence of MAC (Message Authentication Code) of the activation software, and if the MAC is present, the main calculation unit 109 outputs the hash value of the activation software and the MAC of the activation software.

The security calculation unit 110 computes the MAC expected value, which is the expected value of the MAC, based on the configuration verification key which is stored in the storing unit 111, and the hash value of the activation software, and compares the MAC and the MAC expected value output from the main calculation unit 109. The configuration verification key is a private key for computing the MAC.

When the MAC of the activation software and the MAC expected value match, the main calculation unit 109 activates the activation software. If the MAC of the activation software and the MAC expected value do not match, the main calculation unit 109 stops the process.

Specifically, it is as follows.

When the power is turned on in step S501, the main calculation unit 109 executes the boot program stored in the boot ROM 108.

In step S502, the boot program determines the presence/absence of the MAC of the boot loader. If the MAC is present, the process proceeds to step S503. If the MAC is absent, the process proceeds to step S505.

In step S503, the boot program outputs the hash value and MAC of the software of the boot loader to the security calculation unit 110.

In step S504, the security calculation unit 110 computes the MAC expected value, which is the expected value of the MAC, based on the configuration verification key and the hash value. The security calculation unit 110 compares the MAC expected value with the MAC output from the boot program. If both do not match, the security calculation unit 110 stops the process. If both match, the process proceeds to step S508.

Next, the main calculation unit 109 performs the signature verification for the activation software if the MAC is absent in the activation software. If the signature verification is successful, the main calculation unit 109 outputs the hash value of the activation software to the security calculation unit 110. If the signature verification is not successful, the main calculation unit 109 stops the process.

When the security calculation unit 110 acquires the hash value of the activation software from the main calculation unit 109, the security calculation unit 110 determines the presence/absence of the configuration verification key. If the configuration verification key is present, the security calculation unit 110 stops the process. If the configuration verification key is absent, the security calculation unit 110 temporarily stores in the storing unit 111, the hash value of the activation software.

Specifically, it is as follows.

In step S505, the boot program verifies the signature of the software of the boot loader. If the verification fails, the boot program stops the process. If the verification is successful, in step S506, the boot program outputs the hash value of the software of the boot loader to the security calculation unit 110. The security calculation unit 110 determines the presence/absence of the configuration verification key, and stops the process if the configuration verification key is present. If the configuration verification key is absent, in step S507, the security calculation unit 110 temporarily stores the hash value in the storing unit 111.

Then, in step S508, the main calculation unit 109 activates the boot loader.

Next, the OS is also activated in the same manner as the boot loader.

In step S509, the boot loader determines the presence/absence of the MAC of the OS. If the MAC is present, the process proceeds to step S510. If the MAC is absent, the process proceeds to step S512.

In step S510, the boot loader outputs the hash value and MAC of the software of the OS to the security calculation unit 110.

In step S511, the MAC is computed based on the configuration verification key and the hash in the security calculation unit 110, and is compared with the MAC output from the boot loader. If both do not match, the process is stopped. If both match, in step S515, the main calculation unit 109 activates the OS.

If the MAC is absent in the OS in step S509, the bootloader verifies the signature of the software of the OS in step S512. If the signature verification fails, the process is stopped. If the signature verification is successful, the process proceeds to step S513.

In step S513, the boot loader outputs the hash value of the software of the OS to the security calculation unit 110. The security calculation unit 110 determines the presence/absence of the configuration verification key, and stops the process if the configuration verification key is present. If the configuration verification key is absent, in step S514, the security calculation unit 110 temporarily stores in the storing unit 111, the hash value of the OS.

Then, in step S515, the main calculation unit 109 activates the OS.

Next, the application is also activated in the same manner as the boot loader and the OS.

In step S516, the OS determines the presence/absence of the MAC of the application. If the MAC is present, the process proceeds to step S517. If the MAC is absent, the process proceeds to step S519.

In step S517, the OS outputs the hash value and MAC of the software of the application to the security calculation unit 110.

In step S518, the MAC is computed based on the configuration verification key and the hash value in the security calculation unit 110, and is compared with the MAC output from the OS. If both do not match, the process is stopped. If both match, in step S522, the application is activated by the main calculation unit 109.

If the MAC is absent in the application in step S516, the signature of the software of the application is verified in step S519. If the signature verification fails, the process is stopped. If the signature verification is successful, in step S520, the OS outputs the hash value of the software of the application to the security calculation unit 110. The security calculation unit 110 determines the presence/absence of the configuration verification key, and if the configuration verification key is present, stops the process. If the configuration verification key is absent, in step S521, the security calculation unit 110 temporarily stores the hash value of the application in the storing unit 111.

Then, in step S522, the main calculation unit 109 activates the application.

Next, the security calculation unit 110 generates the configuration verification key when the activation for all pieces of activation software is completed. To generate the configuration verification key means to generate a random number and treat the random number as the configuration verification key. Then, the security calculation unit 110 calculates the MAC of each piece of activation software of the plurality of pieces of activation software based on the configuration verification key and the hash value which is temporarily stored in the storing unit 111.

The main calculation unit 109 stores in the non-volatile storage 103, the MAC of each piece of activation software of the plurality of pieces of activation software.

Specifically, it is as follows.

In step S523, when the main calculation unit 109 activates all pieces of activation software to be activated, the main calculation unit 109 transmits an activation end to the security calculation unit 110.

In step S524, the security calculation unit 110 determines the presence/absence of the hash value temporarily stored in the storing unit 111, and if the hash value is absent, the process ends normally. If the hash value temporarily stored in the storing unit 111 is present, the security calculation unit 110 generates the configuration verification key in step S525.

In step S526, the security calculation unit 110 computes the MAC of each pieces of activation software based on the configuration verification key and the hash value of each piece of activation software temporarily stored in the storing unit 111, and outputs the MAC to the main calculation unit 109.

In step S527, the main calculation unit 109 stores in the storage 103, the MAC of each piece of activation software acquired from the security calculation unit 110.

Figure 11:
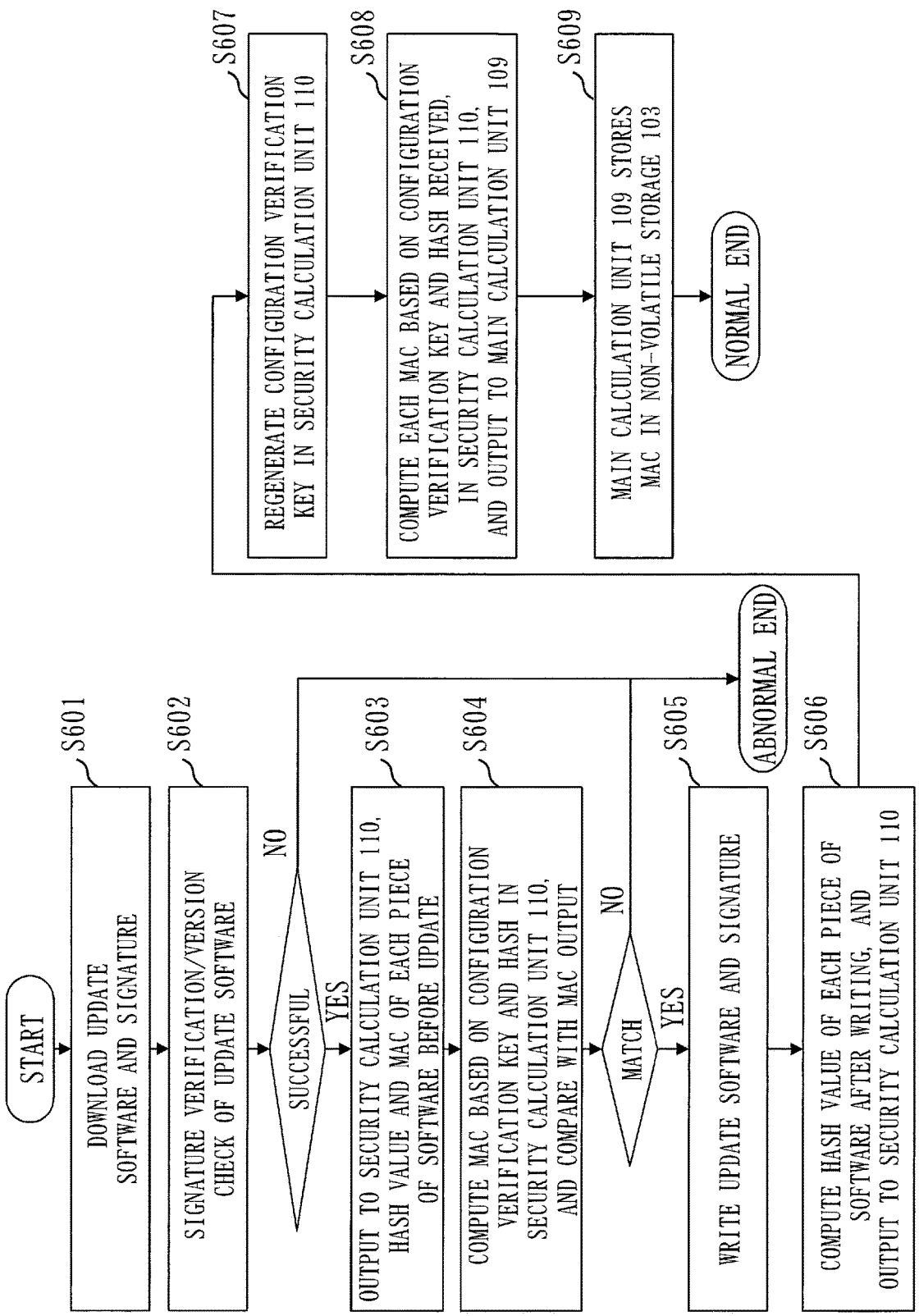
FIG. 11 is a flow diagram of a software update operation of the software verification device according to the third embodiment.

FIG. 11 illustrates the operation of software update according to the present embodiment. Outline of the software update according to the present embodiment will be described below.

The main calculation unit 109 acquires the update software and the signature of the update software, and performs the signature verification and version check for the update software. When the signature verification and version check for the update software are successful, the main calculation unit 109 computes the hash value of the activation software before the update, and outputs to the security calculation unit 110, the hash value of the activation software before the update and the MAC of the activation software before the update which is stored in the storage 103.

The security calculation unit 110 computes the MAC of the activation software before the update based on the hash value output from the main calculation unit 109 and the update verification key stored in the storing unit 111. The security calculation unit 110 compares the computed MAC with the MAC output from the main calculation unit 109.

If the MAC computed by the security calculation unit 110 and the MAC output from the main calculation unit 109 all match, the main calculation unit 109 writes the update software and the signature, and computes the hash value of the update software. The main calculation unit 109 outputs the hash value of the update software to the security calculation unit 110.

The security calculation unit 110 regenerates the verification configuration key, and computes the MAC of the update software using the regenerated verification configuration key and the hash value of the update software. To Regenerate the verification configuration key means to generate a random number and treating the random number as the configuration verification key.

The main calculation unit 109 stores the MAC of the update software in the storage 103.

Specifically, it is as follows.

In step S601, the update software to be updated and its signature are downloaded.

In step S602, the main calculation unit 109 verifies the signature and version of the update software. Specifically, the version verification uses a method such as collation by a list. If the verification fails, the main calculation unit 109 cancels the process as an abnormal end. If the verification is successful, the process proceeds to step S603.

In step S603, the main calculation unit 109 computes the hash value of each piece of activation software before the update, and outputs to the security calculation unit 110, the hash value of each piece of activation software and the MAC of each piece of activation software. The MAC of each piece of activation software before the update is stored in the storage 103.

In step S604, the security calculation unit 110 computes the MAC based on the configuration verification key and the hash value. The security calculation unit 110 compares the computed MAC with the MAC output from the main calculation unit 109, and returns the comparison result to the main calculation unit 109. The main calculation unit 109 ends the process if even one of the results does not match. If all match, in step S605, the main calculation unit 109 writes the update software and the signature into the storage 103 or the memory 104.

In step S606, the main calculation unit 109 outputs to the security calculation unit 110, the hash value of each piece of update software after writing.

In step S607, the security calculation unit 110 regenerates the configuration verification key.

In step S608, the security calculation unit 110 computes the MAC of each piece of update software based on the regenerated configuration verification key and the hash value output from the main calculation unit 109, and outputs the MAC to the main calculation unit 109.

In step S609, the main calculation unit 109 stores in the storage 103, the MAC of each piece of update software acquired from the security calculation unit 110.

Description of Effect of Present Embodiment

According to the software verification device 100 according to the present embodiment, it is possible to speed up the activation, verify the integrity by the device alone, and detect the downgrade in the same manner as the first embodiment. Further, according to the software verification device 100 according to the present embodiment, even if the expected value is stored in a non-secure area, that is, the storage, it is possible to detect attacks such as tampering or erasing and downgrading. In addition, since the MAC can be taken out to the storage, it is effective even when the storage area of the security calculation unit is limited.

According to the software verification device 100 according to the present embodiment, even when the MAC is tampered with or erased unauthorizedly, by verifying the MAC by the configuration verification key or determining the presence/absence of the configuration verification key, it is possible to verify the activation and downgrade of unauthorized programs due to unauthorizedly tampering with or erasing the MAC.

Fourth Embodiment

In the present embodiment, the matters different from the first to third embodiments will be mainly described. Besides, the same reference numerals may be assigned to the same configurations as those in the first to third embodiments, and the descriptions thereof may be omitted.

* Description of Configuration *

In the first to third embodiments, an effect of speeding up the process is obtained by reducing public key calculation, that is, reducing the signature verification. According to the present embodiment, a mean of preventing downgrade in a processor capable of calculating a public key calculation at high speed is indicated. A hardware configuration is the same as in FIG. 1.

* Description of Operation *

Next, an operation of the software verification device 100 according to the present embodiment will be described with reference to FIGS. 12 to 13.

Figure 12:
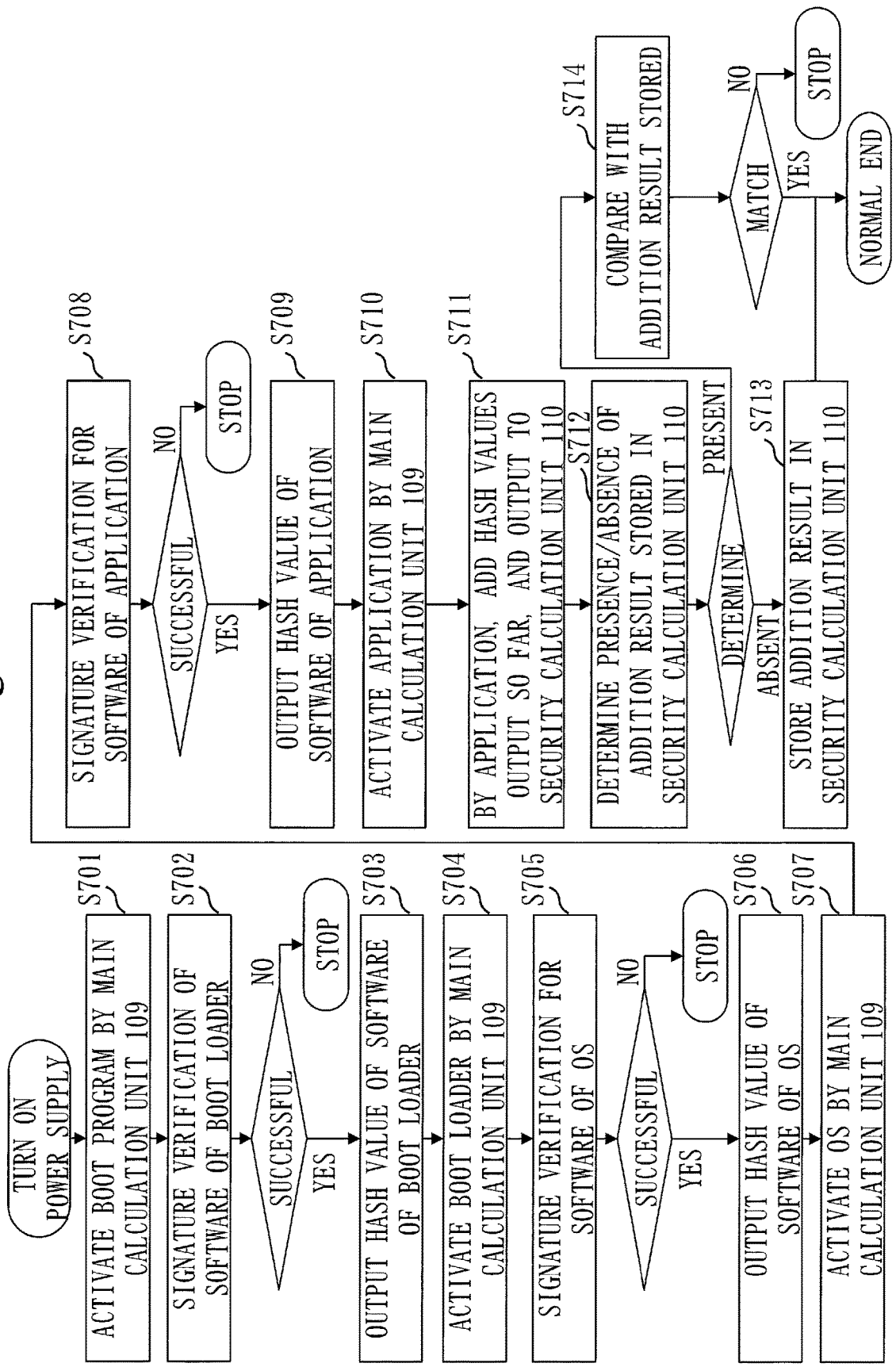
FIG. 12 is a flow diagram of a boot operation of a software verification device according to a fourth embodiment.

FIG. 12 illustrates the boot operation according to the present embodiment. Outline of the boot operation according to the present embodiment will be described below.

The security calculation unit 110 performs the signature verification for the activation software to be activated among the plurality of pieces of activation software, computes the hash value of the activation software if the signature verification is successful, and temporarily stores the hash value in the storing unit 111.

If the signature verification is not successful, the main calculation unit 109 stops the process. On the other hand, if the signature verification is successful, the main calculation unit 109 activates the activation software.

When a last piece of activation software among the plurality of pieces of activation software is activated, the main calculation unit 109 adds all the hash values temporarily stored and outputs an addition result.

The security calculation unit 110 determines whether or not an addition result expected value, which is an expected value of an addition result, is stored in the storing unit 111, and if addition result expected value is absent, the security calculation unit 110 stores the addition result in the storing unit 111 as the addition result expected value. On the other hand, if the addition result expected value is present, the security calculation unit 110 compares an addition result output from the main calculation unit 109 with the addition result expected value.

If the addition result and the addition result expected value do not match, the main calculation unit 109 stops the process. If the addition result and the addition result expected value match, the process ends normally.

Specifically, it is as follows.

In step S701, when the power is turned on, the main calculation unit 109 executes the boot program stored in the boot ROM.

In step S702, the boot program verifies the signature of the software of the boot loader. If the signature verification is successful, in step S703, the boot program generates a hash value of the software of the boot loader. Then, in step S704, the main calculation unit 109 activates the boot loader. If the signature verification is not successful, the main calculation unit 109 stops the process.

In step S705, the boot loader verifies the signature of the software of the OS. If the signature verification is successful, in step S706, the boot loader generates the hash value of the software of the OS. Then, in step S707, the main calculation unit 109 activates the OS. If the signature verification is not successful, the main calculation unit 109 stops the process.

In step S708, the OS verifies the signature of the software of the application. If the signature verification is successful, in step S709, the OS generates a hash value of the software of the application. Then, in step S710, the main calculation unit 109 activates the application. If the signature verification is not successful, the main calculation unit 109 stops the process.

Here, the application is a program to be activated last among the plurality of activation programs.

In step S711, the application adds the hash values generated so far and outputs the addition result to the security calculation unit 110. Exclusive OR is used for the addition. In step S712, the security calculation unit 110 determines whether or not the addition result expected value, which is the expected value of the addition result, is stored in the storing unit 111. If the addition result expected value is absent in the storing unit 111, in step S713, the addition result output from the application is stored in the storing unit 111 as the addition result expected value, and the process ends. In step S714, if the addition result expected value is present in the storing unit 111, the security calculation unit 110 compares the addition result expected value with the addition result output from the main calculation unit 109. If both match, the process ends normally. If both do not match, the process is stopped.

Figure 13:
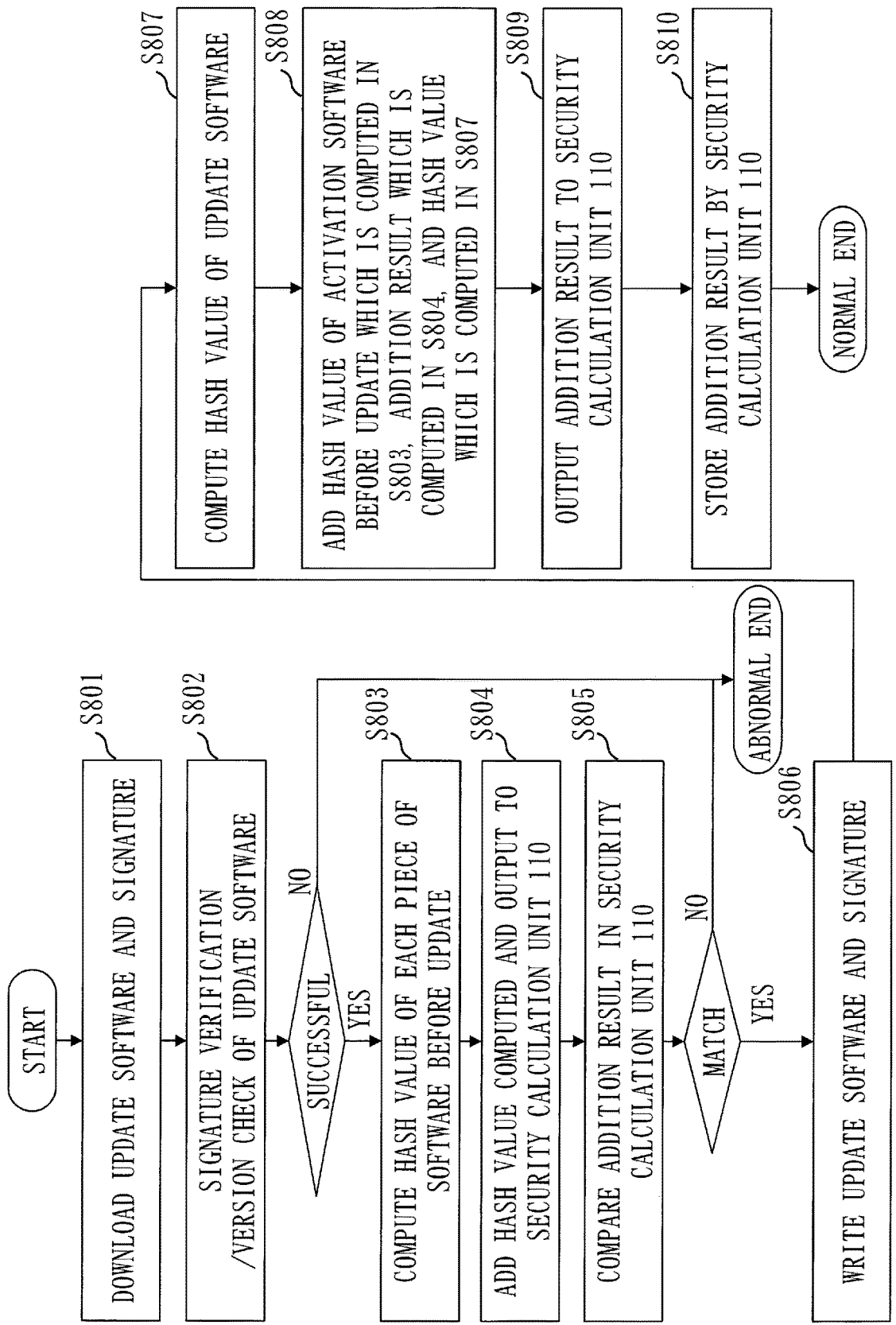
FIG. 13 is a flow diagram of a software update operation of the software verification device according to the fourth embodiment.

FIG. 13 illustrates the operation of the software update according to the present embodiment. Outline of the software update according to the present embodiment will be described below.

The security calculation unit 110 acquires each of the plurality of pieces of update software and signature of each of the plurality of pieces of update software, and calculates the addition result by adding the hash value of each piece of activation software before the update. Then, the security calculation unit 110 compares the calculated addition result with the addition result expected value.

If the addition result and the addition result expected value do not match, the main calculation unit 109 stops the process as an abnormal end. On the other hand, if the addition result and the addition result expected value match, the main calculation unit 109 writes into the storage 103 or the memory 104, each of the plurality of pieces of update software and the signature of each of the plurality of pieces of update software.

The security calculation unit 110 computes the hash value of each piece of update software after the update. The security calculation unit 110 stores in the storing unit 111, the addition result as the addition result expected value obtained by adding the hash value of each piece of update software as well as stores in the storing unit 111, the hash value of each of the plurality of pieces of activation software.

Specifically, it is as follows.

In step S801, the update software to be updated and the signature are downloaded. In step S802, the main calculation unit 109 verifies the signature and version of the update software. The version verification may be a method such as collation by a list. If the verification fails, the main calculation unit 109 stops the process as an abnormal end. If the verification is successful, in step S803, the main calculation unit 109 computes the hash value of each piece of activation software before the update. In step S804, the main calculation unit 109 adds the computed hash and outputs the hash to the security calculation unit 110. Exclusive OR is used for addition. In step S805, the security calculation unit 110 compares the output addition result with the addition result expected value stored in the storing unit 111, and returns the result to the main calculation unit 109.

If the results do not match, the main calculation unit 109 ends the process abnormally. If the results match, in step S806, the main calculation unit 109 writes the update software and the signature into the storage 103 or the memory 104. In step S807, the main calculation unit 109 computes the hash value of the update software after the update. In step S808, the hash value of the activation software before the update, which is computed in step S803, the addition result calculated which is computed in step S804, and the hash value of the update software after the update, which is computed in step S807 are added. In step S809, the main calculation unit 109 outputs the addition result calculated in step S808 to the security calculation unit 110. In step S810, the security calculation unit 110 stores in the storing unit 111, the addition result calculated in step S808.

In the present embodiment, an example of using the exclusive OR for addition is indicated. However, any arithmetic method, for example, such as arithmetic addition may be used. In addition, it is necessary to match with the calculation method to be used, the calculation method of the first addition result in the update software after the update.

Description of Effect of Present Embodiment

According to the software verification device 100 according to the present embodiment, by leaving the addition result of each piece of software acquired at the previous execution, even if the downgrade is carried out after the boot, it is possible to verify at a time of a next boot. Further, according to the software verification device 100 according to the present embodiment, it is possible to expect that the process will be speeded up by reducing the number of accesses to the security calculation unit as compared with a mean of storing in the security calculation unit, the hash value of each piece of software. Further, according to the software verification device 100 according to the present embodiment, since the verification is closed inside the apparatus, it is possible to verify the integrity by the device alone. Furthermore, by using the exclusive OR for the addition of the hash value, it is possible to easily compute the addition result after the update at a time of the software update.

Fifth Embodiment

In the present embodiment, matters different from the first to fourth embodiments will be mainly described. In addition, the same reference numerals may be assigned to the same configurations as those in the first to fourth embodiments, and the descriptions thereof may be omitted.

* Description of Configuration *

In the fourth embodiment, a method for preventing the downgrade in a processor capable of calculating the public key calculation at high speed is described. In the present embodiment, a method is indicated in which the hash can be further stored in the external storage 103 while maintaining security. A hardware configuration is the same as that in FIG. 1.

* Description of Operation *

Next, an operation of the software verification device 100 according to the present embodiment will be described with reference to FIGS. 14 to 16.

Figure 14:
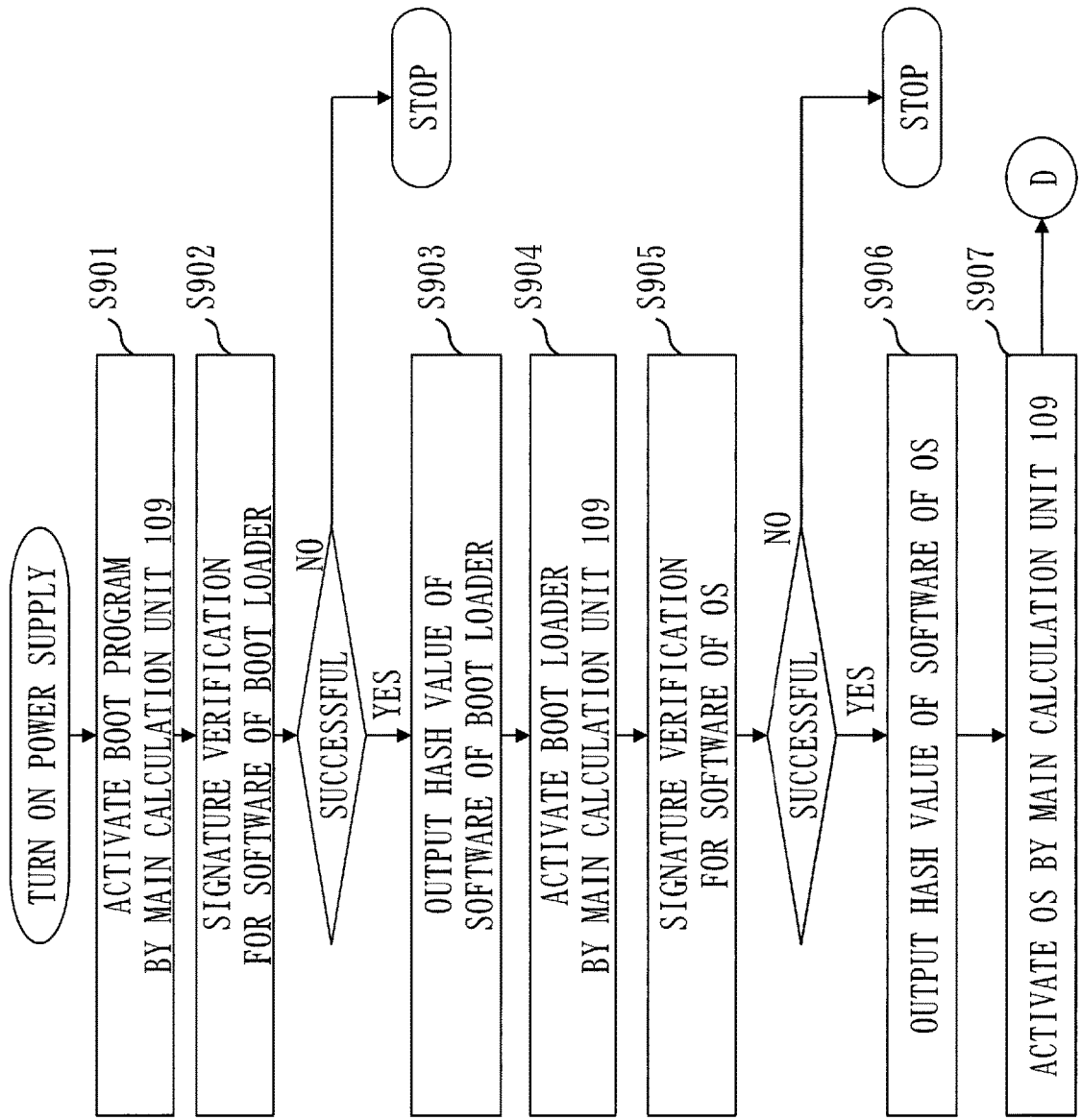
FIG. 14 is a flow diagram of a boot operation of a software verification device according to a fifth embodiment.
Figure 15:
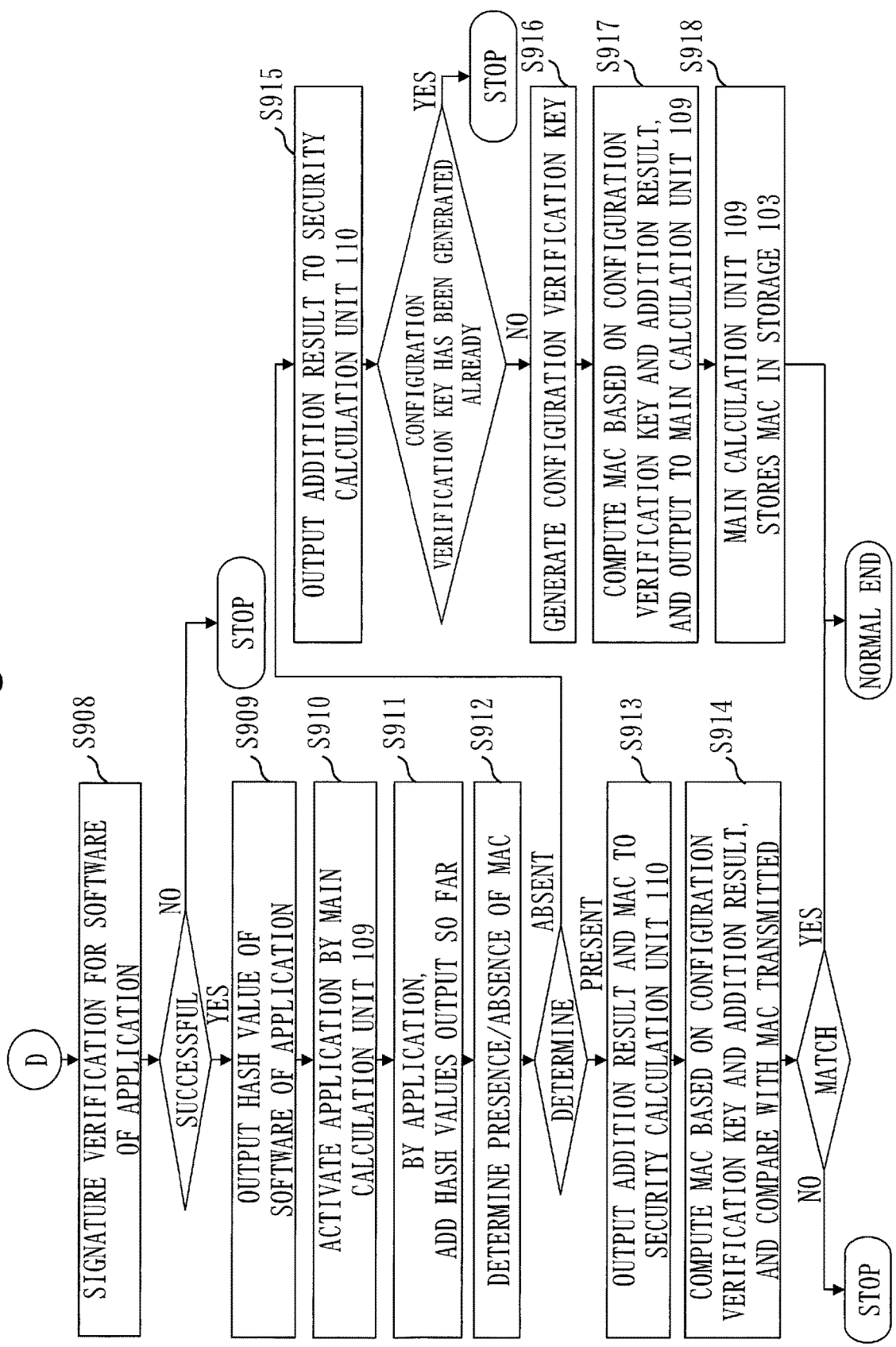
FIG. 15 is a flow diagram of a boot operation of the software verification device according to the fifth embodiment.

FIGS. 14 to 15 illustrates the boot operation according to the present embodiment. Outline of the boot operation according to the present embodiment will be described below.

The main calculation unit 109 performs the signature verification for the activation software to be activated among the plurality of pieces of activation software. If the signature verification is successful, the main calculation unit 109 computes the hash value of the activation software, temporarily stores the hash value in the storing unit 111 in the security calculation unit 110, and activates the activation software.

If the signature verification is not successful, the main calculation unit 109 stops the process.

When the last piece of activation software among the plurality of pieces of activation software is activated, the main calculation unit 109 adds all the hash values temporarily stored in the storing unit 111 and outputs the addition result. Further, the main calculation unit 109 determines the presence/absence of the MAC of the addition result, and if the MAC is present in the addition result, outputs the addition result and the MAC of the addition result.

The security calculation unit 110 computes the MAC expected value, which is the expected value of the MAC, based on the configuration verification key stored in advance in the storing unit 111 and the addition result output from the main calculation unit 109. Then, the security calculation unit 110 compares the MAC expected value with the MAC output from the main calculation unit 109.

The main calculation unit 109 stops the process if the MAC expected value and the MAC output from the main calculation unit 109 do not match, and stops the process normally if the MAC expected value and the MAC output from the main calculation unit 109 match.

If the MAC is absent in the addition result, the security calculation unit 110 determines whether or not the configuration verification key is present in the storing unit 111. If the configuration verification key is not stored, the security calculation unit 110 generates the configuration verification key. Then, the security calculation unit 110 generates the MAC of the addition result based on the configuration verification key and the addition result.

When the configuration verification key is stored, the main calculation unit 109 stops the process. On the other hand, when the MAC of the addition result is generated, the main calculation unit 109 stores in the storage 103, the MAC of the addition result.

Specifically, it is as follows.

In step S901, when the power is turned on, the main calculation unit 109 executes the boot program stored in the boot ROM.

In step S902, the boot program verifies the signature of the software of the boot loader. If the signature verification is successful, the boot program generates the hash value of the software of the boot loader (step S903) and activates the boot loader (step S904). If the signature verification fails, the boot program stops the process.

In step S905, the boot loader verifies the signature of the software of the OS. If the signature verification is successful, the boot loader generates the hash value of the software of the OS (step S906) and activates the OS (step S907). If the signature verification fails, the bootloader stops the process.

In step S908, the OS verifies the signature of the software of the application. If the signature verification is successful, the OS generates the hash value of the software of the application (step S909) and activates the application (step S910). If the signature verification fails, the OS stops the process.

In step S911, the application adds the hashes generated so far. Exclusive OR is used for addition. In step S912, the application determines the presence/absence of the stored MAC. If the stored MAC is present, in step S913, the application outputs the addition result and the MAC to the security calculation unit 110. If the stored MAC is absent, in step S915, the application outputs the addition result to the security calculation unit 110.

In step S914, the security calculation unit 110 that has received the addition result and the MAC computes the MAC as the MAC expected value based on the configuration verification key and the addition result, and compares the computed MAC with the MAC output from the application. If both match, the process ends normally, and if both do not match, the process is stopped.

On the other hand, the security calculation unit 110 that has received the addition result checks the presence/absence of the configuration verification key, and if the configuration verification key is present, the security calculation unit 110 stops the process. If the configuration verification key is absent, in step S916, the security calculation unit 110 generates the configuration verification key. In step S917, the security calculation unit 110 computes the MAC based on the configuration verification key and the addition result, and outputs the computed MAC to the main calculation unit 109. In step S918, the main calculation unit 109 stores the MAC in the non-volatile storage 103 and ends the process normally. In order to protect the MAC from unauthorized deletion, the MAC may be stored in the storing unit 111 of the security calculation unit 110 instead of the storage 103.

Figure 16:
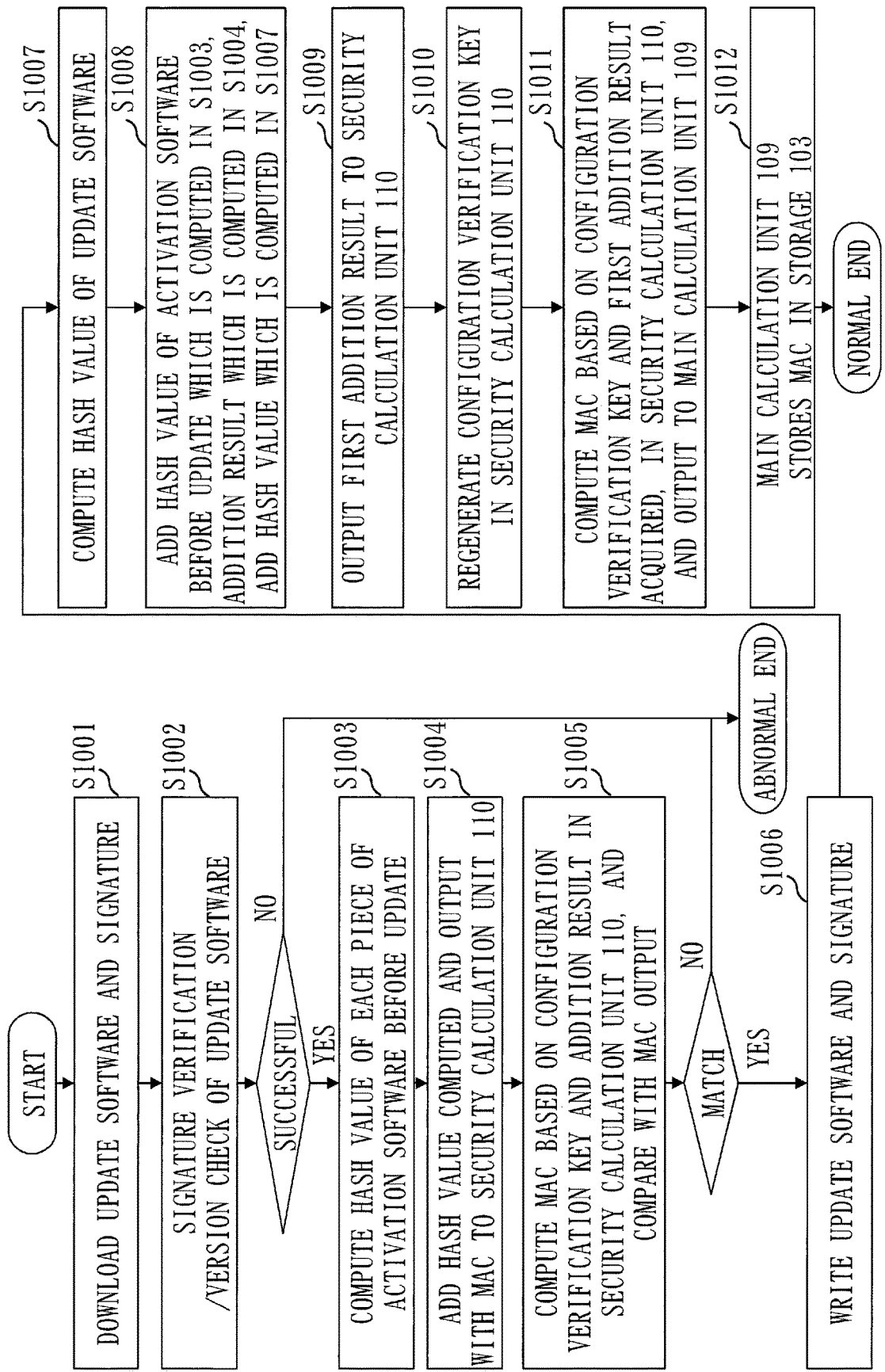
FIG. 16 is a flow diagram of a software update operation of the software verification device according to the fifth embodiment.

FIG. 16 illustrates an operation of the software update according to the present embodiment. Outline of the software update according to the present embodiment will be described below.

The main calculation unit 109 acquires each of the plurality of pieces of update software and the signature of each of the plurality of pieces of update software. Then, the main calculation unit 109 calculates the addition result obtained by adding the hash value of each piece of activation software before the update and calculates the MAC of the addition result. The main calculation unit 109 outputs the addition result obtained by adding the hash value of each piece of activation software before the update and the MAC of the addition result.

The security calculation unit 110 computes the MAC as the MAC expected value based on the configuration verification key and the addition result, and compares the MAC of the addition result with the MAC expected value.

If the MAC of the addition result and the MAC expected value do not match, the main calculation unit 109 stops the process. On the other hand, if the MAC of the addition result and the MAC expected value match, the main calculation unit 109 writes each of the plurality of pieces of update software and the signature of each of the plurality of pieces of update software into the storage 103 or the memory 104.

The main calculation unit 109 computes the hash value of each piece of activation software after the update, and adds as the first addition result: the hash value of each piece of activation software before the update; the addition result obtained by adding the hash value of each piece of activation software before the update; and the hash value of each piece of update software after the update. The main calculation unit 109 outputs the first addition result to the security calculation unit 110.

The security calculation unit 110 regenerates the configuration verification key and computes the MAC of the first addition result based on the configuration verification key and the first addition result.

The main calculation unit 109 stores the MAC of the first addition result in the storage 103.

Specifically, it is as follows.

The processes of steps S1001 to S1003 are the same as the processes of steps S801 to S803.

In step S1004, the main calculation unit 109 adds the hash value of each piece of activation software before the update and outputs the hash value to the security calculation unit 110 together with the MAC. Exclusive OR is used for addition. In step S1005, the security calculation unit 110 computes the MAC based on: the addition result output from the main calculation unit 109; and the configuration verification key, and compares the computed MAC with the MAC output from the main calculation unit 109. The security calculation unit 110 returns the comparison result to the main calculation unit 109.

If the comparison results do not match, the main calculation unit 109 ends the process. If the comparison results match, in step S1006, the main calculation unit 109 writes the update software and the signature into the storage 103 or the memory 104. In step S1007, the main calculation unit 109 computes the hash value of each piece of update software after the update. In step S1008, the hash value of each piece of activation software before the update which is computed in step S1003, the addition result which is computed in step S1004, and the hash value of each piece of update software after the update which is computed in step S1007 are added as the first addition result. In step S1009, the main calculation unit 109 outputs the first addition result to the security calculation unit 110. In step S1010, the security calculation unit 110 regenerates the configuration verification key. In step S1011, the security calculation unit 110 computes the MAC based on the configuration verification key and the first addition result, and outputs the MAC to the main calculation unit 109. In step S1012, the main calculation unit 109 stores in the storage 103, the MAC of the first addition result. In order to protect the MAC from unauthorized deletion, it is acceptable to store the MAC in the storing unit 111 of the security calculation unit 110 instead of the storage 103.

In the present embodiment, an example of using the exclusive OR for addition is indicated. However, any arithmetic method, for example, such as arithmetic addition may be used. In addition, it is necessary to match with the calculation method to be used, the calculation method of the addition result in the update software after the software update.

Description of Effect of Present Embodiment

According to the software verification device 100 according to the present embodiment, in addition to the effect of the fourth embodiment, since the MAC can be taken out to the storage, it is effective even when there is limitation on the storage area of the security calculation unit.

According to the software verification device 100 according to the present embodiment, the MAC verification using the configuration verification key or determination of the presence/absence of the configuration verification key is carried out. Therefore, according to the software verification device 100 according to the present embodiment, even if the MAC is tampered with or erased unauthorizedly, it is possible to verify activation or downgrade of the unauthorized program due to tampering with or erasing the MAC.

In the above-described first to fifth embodiments, each unit of the software verification device has been described as an independent functional block. However, a configuration of the software verification device does not have to be a configuration similar to the above-described embodiments. The functional block of the software verification device may have any configuration as long as it is possible to realize functions described in the above-described embodiments. Further, the software verification device may be a system configured by a plurality of devices instead of one device.

Further, a plurality of parts of the first to fifth embodiments may be combined and implemented. Alternatively, one part of these embodiments may be implemented. In addition, these embodiments may be implemented in any combination as a whole or partially.

That is, in the first to fifth embodiments, it is possible to freely combine each embodiment, modify any component of each embodiment, or omit any component in each embodiment.

Besides, in the embodiments described above are essentially preferred examples and are not intended to limit the scope of the present invention, the scope of application of the present invention, and the scope of use of the present invention. The above-described embodiment can be variously modified as needed.

REFERENCE SIGNS LIST

100: software verification device, 102: processor, 103: storage, 104: memory, 104: memory, 105: communication device, 106: input device, 107: display device, 108: boot ROM, 109: main calculation unit, 110: security calculation unit, 111: storing unit, 112: electronic circuit.

The invention claimed is:

1. A software verification device comprising:

processing circuitry to determine the presence/absence of a MAC (Message Authentication Code) of an activation software, and output a hash value of the activation software and the MAC of the activation software when the MAC is present, to comprise a non-volatile memory, which before an update is performed will, compute a MAC expected value by: activating a plurality of pieces of the activation software, generating the configuration verification key and using it with the hash value temporarily stored in the non-volatile memory to calculate the MAC of each piece of activation software; combining the MAC of each piece of activation software, and compare with the MAC expected value, the MAC output from the processing circuitry, and to activate the activation software when the MAC output from the processing circuitry and the MAC expected value match, and stop the update when the MAC output from the processing circuitry and the MAC expected value do not match.

2. The software verification device according to claim 1, wherein the processing circuitry performs signature verification for the activation software when the MAC is absent in the activation software, outputs the hash value of the activation software, and stops a process when the signature verification is not successful, and determines presence/absence of the configuration verification key when the hash value of the activation software is acquired, stops a process when the configuration verification key is present, and temporally stores in the non-volatile memory, the hash value of the activation software when the configuration verification key is absent.

3. The software verification device according to claim 1, wherein the software verification device activates a plurality of pieces of activation software, and wherein the processing circuitry generates the configuration verification key when activation of all pieces of activation software is completed, and calculates MAC of each piece of activation software of the plurality of pieces of activation software based on the configuration verification key and the hash value which is temporally stored in the non-volatile memory, and stores in a non-volatile storage, the MAC of each piece of activation software of the plurality of pieces of activation software.

4. The software verification device according to claim 3, wherein the processing circuitry acquires update software and signature of the update software, computes a hash value of activation software before update when signature verification and version check for the update software are successful, and outputs the hash value of the activation software before the update and the MAC of the activation software, which is stored in the storage, before the update, computes the MAC of the activation software before the update based on the hash value, which is output from the processing circuitry, and the configuration verification key, and compares with the MAC output from the processing circuitry, MAC computed, writes the update software and signature when the MAC computed and the MAC output from the processing circuitry all match, computes the hash value of the update software, and outputs the hash value, regenerates the configuration verification key, and computes the MAC of the update software using a regenerated configuration verification key and the hash value of the update software, and stores in the storage, the MAC of the update software.

* * * * *